US010900795B2

(12) United States Patent
Mazzella et al.

(10) Patent No.: US 10,900,795 B2
(45) Date of Patent: Jan. 26, 2021

(54) METHOD AND SYSTEM FOR IDENTIFYING MEETING POINTS

(71) Applicant: COMUTO S.A., Paris (FR)

(72) Inventors: Frederic Gabriel Mazzella, Paris (FR); Arnaud Marc Tellier, Cupertino, CA (US)

(73) Assignee: COMUTO S.A., Paris (FR)

( * ) Notice: Subject to any disclaimer, the term of this patent is extended or adjusted under 35 U.S.C. 154(b) by 251 days.

(21) Appl. No.: 15/656,011

(22) Filed: Jul. 21, 2017

(65) Prior Publication Data
US 2018/0023967 A1    Jan. 25, 2018

Related U.S. Application Data

(60) Provisional application No. 62/365,605, filed on Jul. 22, 2016.

(51) Int. Cl.
*G01C 21/34* (2006.01)
*G06Q 50/30* (2012.01)

(52) U.S. Cl.
CPC ....... *G01C 21/3438* (2013.01); *G01C 21/343* (2013.01); *G01C 21/3415* (2013.01); *G01C 21/3446* (2013.01); *G06Q 50/30* (2013.01)

(58) Field of Classification Search
CPC .. G01C 21/34; G01C 21/3407; G01C 21/343; G01C 21/3438; G01C 21/3446; G01C 21/3453; G01C 21/3461; G01C 21/3469; G01C 21/3476; G01C 21/3484; G01C 21/3492; G01C 21/36; G01C 21/3605; G01C 21/3617; G01C 21/362; G01C 21/3679; G01C 21/3682; G01C 21/3685; G01C 21/3691; G01C 21/3694
See application file for complete search history.

(56) References Cited

U.S. PATENT DOCUMENTS 6,356,838 B1    3/2002 Paul
6,751,548 B2    6/2004 Fox et al.
(Continued)

FOREIGN PATENT DOCUMENTS

WO    20140203256 A1    12/2014
WO    2016019189 A1    2/2016

OTHER PUBLICATIONS

Furuhata, Masabumi et al., "Ridesharing: The state-of-the-art and future directions", Transportation Research Part B: Methodological, vol. 57, Nov. 2013, pp. 28-46.

*Primary Examiner* — Thomas G Black
*Assistant Examiner* — Sara J Lewandroski
(74) *Attorney, Agent, or Firm* — BCF LLP

(57) ABSTRACT

A method of and a system for processing a ridesharing request. The method comprising receiving instructions to create a trip in the ridesharing platform; generating an original route by causing to compute an original polyline defining the original route; accessing a set of meeting points; determining from the set of meeting points, candidate meeting points which are within a distance from the original polyline; generating for each one of the candidate meeting points, a detour route by causing to compute a detour polyline defining the detour route; identifying selected candidate meeting points from the candidate meeting points; and storing the selected candidate meeting points, the selected candidate meeting points being associated with the trip.

14 Claims, 14 Drawing Sheets

(56) References Cited

U.S. PATENT DOCUMENTS

| | | |
|---|---|---|
| 7,080,019 B1 | 7/2006 | Hurzeler |
| 7,391,341 B2 | 6/2008 | Keaveny et al. |
| 8,140,256 B1 | 3/2012 | Dos-Santos et al. |
| 8,285,571 B2 | 10/2012 | Demirdjian et al. |
| 8,688,378 B2 | 4/2014 | McCall et al. |
| 8,688,532 B2 | 4/2014 | Khunger et al. |
| 8,706,409 B2 | 4/2014 | Mason et al. |
| 8,825,383 B1 * | 9/2014 | Kirmse .............. G01C 21/3438 |
| | | 701/426 |
| 8,909,475 B2 | 12/2014 | Gishen et al. |
| 9,068,837 B2 * | 6/2015 | Holsinger .......... G01C 21/3438 |
| 9,267,807 B2 | 2/2016 | Choudhury |
| 9,483,744 B2 | 11/2016 | Lord et al. |
| 9,562,785 B1 * | 2/2017 | Racah ................ G01C 21/3438 |
| 9,702,719 B2 | 7/2017 | Mason et al. |
| 9,816,824 B1 | 11/2017 | Racah |
| 9,857,190 B2 | 1/2018 | Marueli et al. |
| 9,886,671 B2 | 2/2018 | Lord et al. |
| 9,898,759 B2 | 2/2018 | Khoury |
| 9,904,900 B2 | 2/2018 | Cao |
| 2007/0276595 A1 | 11/2007 | Lewinson et al. |
| 2008/0091342 A1 | 4/2008 | Assael |
| 2008/0270204 A1 | 10/2008 | Poykko et al. |
| 2009/0083111 A1 | 3/2009 | Carr |
| 2009/0248587 A1 | 10/2009 | Van Buskirk |
| 2012/0078672 A1 | 3/2012 | Mohebbi et al. |
| 2013/0268195 A1 | 10/2013 | Tai et al. |
| 2014/0082069 A1 | 3/2014 | Varoglu et al. |
| 2014/0173511 A1 | 6/2014 | Lehmann et al. |
| 2014/0207375 A1 | 7/2014 | Lerenc |
| 2014/0350975 A1 | 11/2014 | Paperno |
| 2015/0006072 A1 | 1/2015 | Goldberg et al. |
| 2015/0095198 A1 | 4/2015 | Eramian |
| 2015/0142484 A1 | 5/2015 | Huang et al. |
| 2015/0206267 A1 * | 7/2015 | Khanna .............. G06Q 30/0284 |
| | | 705/5 |
| 2015/0254581 A1 | 9/2015 | Brahme |
| 2015/0285643 A1 * | 10/2015 | Tucker .................. H04L 51/32 |
| | | 701/519 |
| 2015/0285651 A1 | 10/2015 | Cerecke et al. |
| 2015/0324718 A1 * | 11/2015 | Lord .................. G06Q 10/047 |
| | | 705/7.13 |
| 2016/0027306 A1 * | 1/2016 | Lambert ................ G08G 1/202 |
| | | 701/117 |
| 2016/0334232 A1 * | 11/2016 | Zhuang ............ G01C 21/3438 |
| 2016/0356615 A1 * | 12/2016 | Arata ..................... G06Q 50/30 |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0039488 A1 * | 2/2017 | Lin ...................... G08G 1/202 |
| 2017/0052034 A1 * | 2/2017 | Magazinik ......... G01C 21/3484 |
| 2017/0138749 A1 * | 5/2017 | Pan .................... G01C 21/3438 |
| 2017/0167882 A1 * | 6/2017 | Ulloa Paredes ... G01C 21/3492 |
| 2017/0276499 A1 * | 9/2017 | Sun ........................ G06F 16/29 |
| 2017/0284820 A1 * | 10/2017 | Dryjanski ............... G08G 1/202 |
| 2017/0307391 A1 | 10/2017 | Mason et al. |
| 2017/0314947 A1 * | 11/2017 | Lee .................... G01C 21/3438 |
| 2017/0344010 A1 * | 11/2017 | Rander ................ G05D 1/0022 |
| 2018/0040244 A1 * | 2/2018 | Ye ...................... G01C 21/3438 |
| 2018/0268039 A1 * | 9/2018 | Gusenbauer ...... G06F 16/24575 |
| 2018/0365629 A1 * | 12/2018 | Zeng .................. G08G 1/205 |
| 2019/0066250 A1 * | 2/2019 | Levy ................. G01C 21/3438 |

* cited by examiner

METHOD AND SYSTEM FOR IDENTIFYING MEETING POINTS

CROSS-REFERENCE TO RELATED APPLICATION

This United States Non-Provisional application claims priority from U.S. Provisional Application Ser. No. 62/365,605, filed on Jul. 22, 2016, the entire content of which is incorporated herein by reference.

FIELD

The present technology relates to systems and methods for identifying meeting points. In particular, the systems and methods aim at processing a rideshare request and causing to identify trips associated with candidate meeting points to be presented to a potential passenger.

BACKGROUND

Over the past years, ridesharing (also referred to as carpooling, car sharing and lift sharing) has become increasingly popular, largely thanks to online ridesharing platforms such as Blablacar™. Ridesharing platforms such as Blablacar™ have facilitated matching drivers offering available seats in a vehicle with passengers looking for drivers offering such available seats. The general concept is that the ridesharing platforms allow connecting drivers to passengers willing to travel together between cities and share the cost of the journey. Benefits of such approach are readily known, amongst which, without being limited to, reducing travelling costs, reducing traffic on the roads thereby lowering greenhouse gases and pollutant levels and/or creating a social experience by facilitating connections between individuals who would have otherwise not met.

Typically, an online ridesharing platform may be accessed by electronic devices via a web browser and/or an application (also referred to as an "app"). In some instances, the drivers and/or the passengers may register and create a personal online profile. The personal online profile may include ratings and reviews by other members, social network verification, etc. The personal online profile may show how much experience the user has with the service and, in some instances, a "Blabla" measurement indicating how much a user is willing to chat during a trip.

Once the drivers and/or the passengers have registered with the service, they may either publish a trip (for cases where the user is a driver offering seats) or search for a trip (for cases where the user is a passenger looking for seats). For instances where the user is a driver, the platform may require certain information to be provided. Such information may include, but is not limited to, driver departure position, driver arrival position, waypoints (also referred to as stop-overs between the driver departure position and the driver arrival position), departure time and date, number of available seats, kilometric rate paid by passenger, etc. Once the information is provided, the platform may generate a route, which, in some instances, may be a realistic route. The realistic route may comprise a trajectory, duration and/or a realistic distance. The information provided by the driver and/or the route generated by the platform may be published in a searchable database and referred to as a trip or trip data.

Once a trip is published, it may then be accessed by a passenger. In some instances, the passenger may provide information to a trip search engine. The information may take the form of a rideshare request and may comprise information such as a passenger departure position, a passenger arrival position, a departure time and date, number of required seats, etc. The trip search engine may then determine which trips amongst the trips published in the trip database match at least some criteria of the rideshare request. The trip search engine may then present a list of trips meeting at least some criteria of the rideshare request to the passenger. The passenger may then select the trips that she/he deems the most appropriate and connect with the driver associated with the selected trips to complete a transaction.

Even though ridesharing platforms enabling a trip search engine has greatly improved the ridesharing experience for both the drivers and the passengers by allowing great volumes of trips to be published by drivers and searched by passengers, improvements may still be desirable.

SUMMARY

Embodiments of the present technology have been developed based on developers' appreciation of at least one shortcoming associated with the prior art.

In particular, at least one shortcoming associated with current ridesharing platforms may arise when a meeting point between a driver and a passenger is to be identified in a way that a detour for the driver remains acceptable. This shortcoming may, in some instances, lead to situations wherein the ridesharing may not be able to return relevant results to a passenger even though, in real life, at least one driver associated with one or more trips published in the trip database would have been willing to undertake a detour to pick up and/or drop off the passenger at a meeting point.

In addition, a high number of trips stored in the trip database may limit an ability of the trip search engine to compute a high number of detours in order to identify which meeting points, amongst the meeting points stored in the meeting points database, may be more likely to be acceptable for one or more drivers. This shortcoming may be further emphasised by a necessity to provide results to the passenger within an acceptable period of time (typically a few seconds).

The present technology arises from an observation made by the inventor(s) that, upon receiving instructions from a driver to create a trip in a ridesharing platform, an original polyline defining an original route may be generated and a set of meeting points may be accessed from a database. Candidate meeting points may be then determined from the set of meeting points based on a distance with the original polyline. Then, for at least some of the candidate meeting points, a detour polyline defining a detour route crossing a given candidate meeting point may be generated. The original route and the detour route may then be compared to identify selected candidate meeting points which are to be associated with the trip and stored in a trip database. The selected candidate meeting points may then be relied upon to select candidate trips from the trip database upon receiving a rideshare request from a potential passenger.

In some instances, upon receiving, from a passenger, a rideshare request comprising a search departure position and a search arrival position, the rideshare platform may determine that at least one trip, amongst the trips stored in a database, may be a candidate by determining whether selected meeting point(s) associated with the trip is (are) within a distance from the search departure position and/or the search arrival position.

The present technology therefore allows determining whether a trip is a candidate for a detour route crossing the meeting point which would be acceptable for a driver associated with the trip. The present technology allows making such determination without requiring extensive computation at the time of processing the rideshare request thereby reducing the processing power required for the trip search engine and/or improving a response time for providing results to a passenger.

Other benefits may also become apparent to the person skilled in the art of the present technology further to the reading of the description of the technology set forth below.

In one aspect, various implementations of the present technology provide computer-implemented method for execution by a ridesharing platform, the method comprising:

receiving, from an electronic device associated with a driver, instructions to create a trip in the ridesharing platform, the instructions being associated with a driver departure position, a driver arrival position and a deviation threshold reflective of an acceptable deviation from an original route from the driver departure position to the driver arrival position, the deviation threshold being associated with at least one of a deviation distance and a deviation duration;

generating an original route by causing to compute an original polyline defining the original route, the original polyline extending from the driver departure position to the driver arrival position, the original polyline being associated with a geographical coordinate system, the original route being associated with at least one of an original route distance and an original trip duration;

accessing, from a meeting point database, a set of meeting points, each one of the meeting points of the set of meeting points being associated with the geographical coordinate system;

determining, by a processor, from the set of meeting points, candidate meeting points which are within a distance from the original polyline;

generating, for each one of the candidate meeting points, a detour route by causing to compute a detour polyline defining the detour route, the detour polyline extending from the driver departure position to the one of the candidate meeting points and from the one of the candidate meeting points to the driver arrival position, the detour route being associated with at least one of a detour route distance and a detour trip duration;

identifying, by the processor, selected candidate meeting points from the candidate meeting points based on a comparison of the original route and the detour route; and storing, in a trip database, the selected candidate meeting points, the selected candidate meeting points being associated with the trip.

In another aspect, various implementations of the present technology provide computer-implemented method execution by a ridesharing platform, the method comprising:

receiving, from an electronic device associated with a potential passenger, a rideshare request, the rideshare request being associated with (1) a search departure position and (2) a search arrival position;

accessing, from a trip database, trips associated with selected meeting points, the selected meeting points being associated with a geographical coordinate system;

selecting, by a processor, candidate trips from the trips based on a comparison of at least one of the search departure position and the search arrival position and the selected meeting points, the comparison comprising a determination as to whether a given selected meeting point is within a distance from the at least one of the search departure position and the search arrival position; and transmitting, to the electronic device, the candidate trips for displaying to the potential passenger.

In other aspects, various implementations of the present technology provide a computer-based system, such as, for example, but without being limitative, an electronic device comprising at least one processor and a memory storing program instructions for processing a rideshare request, the program instructions being executable by one or more processors of the computer-based system to carry out one or more of the above-recited methods.

In other aspects, various implementations of the present technology provide a non-transitory computer-readable medium storing program instructions for processing a rideshare request, the program instructions being executable by a processor of a computer-based system to carry out one or more of the above-recited methods.

In yet other aspects, various implementations of the present technology provide a computer-based system, such as, for example, but without being limitative, an electronic device comprising at least one processor and a memory storing program instructions for processing instructions to create a trip in a ridesharing platform, the program instructions being executable by one or more processors of the computer-based system to carry out one or more of the above-recited methods.

In other aspects, various implementations of the present technology provide a non-transitory computer-readable medium storing program instructions for processing instructions to create a trip in a ridesharing platform, the program instructions being executable by a processor of a computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Yet as another example, it should be understood that, the use of the terms "first direction" and "third direction" is not intended to imply, unless specified otherwise, any particular order, type, chronology, hierarchy or ranking (for example) of/between the directions, nor is their use (by itself) intended imply that any "second direction" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
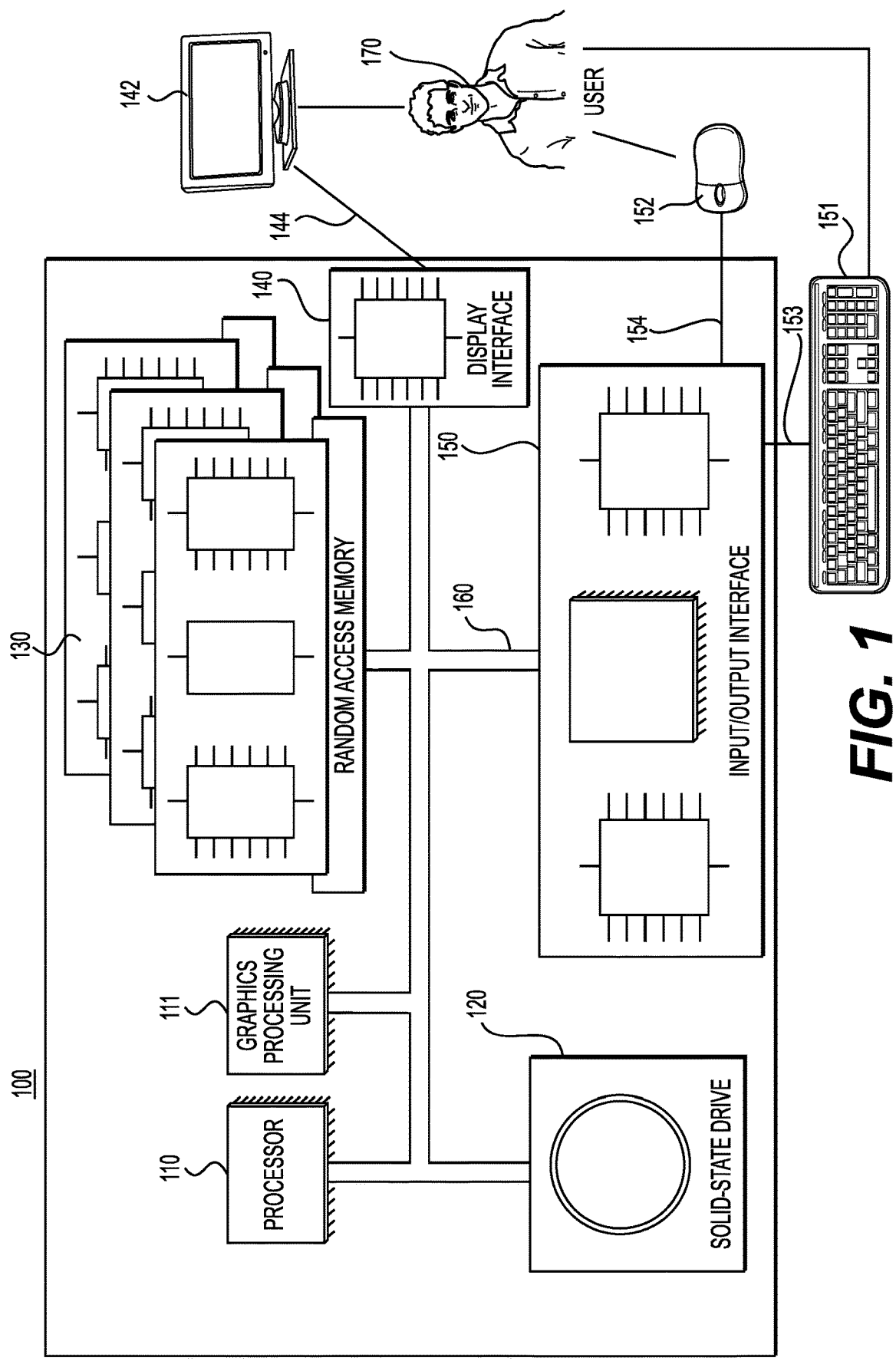
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing a rideshare request and/or instructions to create a trip in a ridesharing platform. For example, the program instructions may be part of a library or an application.

Figure 2:
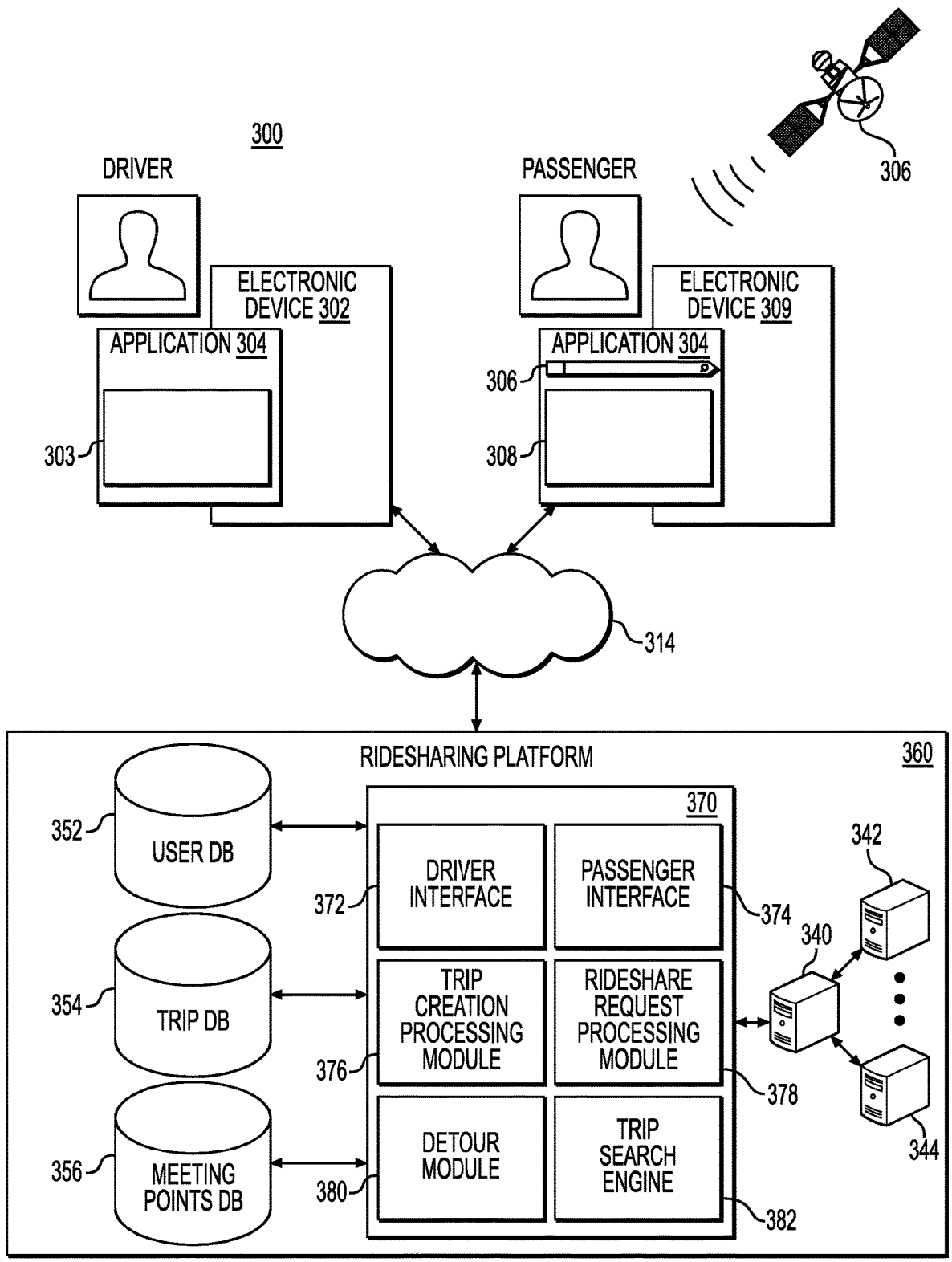
FIG. 2 is a diagram of a networked computing environment in accordance with an embodiment of the present technology.

In FIG. 2, there is shown a networked computing environment 300 suitable for use with some implementations of the present technology. The networked computing environment 300 comprises a first electronic device 302 and a second electronic device 309. Each of the first electronic device 302 and the second electronic device 309 may also be referred to as a "client device", an "electronic device" or an "electronic device associated with the user". Each of the first electronic device 302 and the second electronic device 309 may be associated with users, such as the user 170. For the purpose of illustrating the present technology, the first electronic device 302 is associated with a driver (i.e., a user offering seats) and the second electronic device 309 is associated with a passenger (i.e., a user looking for available seats). Even though reference is made to a driver, the term "driver" should be broadly construed as an individual offering seats via a ridesharing platform. Also, even though reference is made to a passenger, the term "passenger" should be broadly construed as an individual looking for seats via a ridesharing platform and may be interchangeably used with the term "potential passenger", amongst other terms. It should also be noted that the fact that the first electronic device 302 and the second electronic device 309 are respectively associated with the driver and the passenger, it does not need to suggest or imply any mode of operation— such as a need to log in, a need to be registered or the like.

The implementation of the first electronic device 302 and the second electronic 309 is not particularly limited, but as an example, the first electronic device 302 and the second electronic 309 may be implemented as a personal computer (desktops, laptops, netbooks, etc.), a wireless communication device (a cell phone, a smartphone, a tablet and the like) or a connected object (a connected watch, a connected car, an augment reality device and the like). The first electronic device 302 and the second electronic 309 may each comprise hardware and/or software and/or firmware (or a combination thereof), as is known in the art, to execute an application 304. Generally speaking, the purpose of the application 304 is to enable a driver and/or a passenger to execute various functions relating to interactions between drivers and passengers, such as, but not limited to, (1) creating and publishing new trips, (2) searching and identifying trips relevant to a given passenger and (3) communicating and completing a transaction between a passenger and a driver. To that end, the application 304 comprises various graphical user interface (GUI) elements amongst which, a form 303 allowing creation of a new trip, a search query interface 306 and a search results interface 308.

How the application 304 is implemented is not particularly limited. One example of the application 304 may be embodied in the driver or the passenger accessing a web site associated with a ridesharing platform. For example, the application 304 can be accessed by typing in an URL associated with Blablacar™ ridesharing platform at www.blablacar.fr. It should be expressly understood that the search application 304 can be accessed using any other commercially available or proprietary search engine.

In alternative non-limiting embodiments of the present technology, the application 304 may be implemented as a browser application on a portable device (such as a wireless communication device). For example (but not limited) to those implementations, where the first electronic device 302 or the second electronic device 309 is implemented as a portable device, such as for example, Samsung™ Galaxy™ S7 or Apple™ iPhone 6S™, the first electronic device 302 or the second electronic device 309 may be executing a Apple, Google, Microsoft or Yandex browser application. In some other embodiments, the application 304 may be implemented as an "app" available on an app store such as the App Store™ from Apple. It should be expressly understood that any other commercially available or proprietary browser application or any available or proprietary app can be used for implementing non-limiting embodiments of the present technology.

The first electronic device 302 and the second electronic device 309 are coupled to a communications network 314 via a communication link (not shown). In some non-limiting embodiments of the present technology, the communications network 314 can be implemented as the Internet. In other embodiments of the present technology, the communications network 314 can be implemented differently, such as any wide-area communications network, local-area communications network, a private communications network and the like.

How the communication link (not shown) is implemented is not particularly limited and will depend on how the first electronic device 302 or the second electronic device 309 is implemented. Merely as an example and not as a limitation, in those embodiments of the present technology where the first electronic device 302 or the second electronic device 309 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the first electronic device 302 or the second electronic device 309 is implemented as a notebook computer, the communication link can be either wireless (such as the Wireless Fidelity, or WiFi® for short, Bluetooth® or the like) or wired (such as an Ethernet based connection). In some implementations, the first electronic device 302 or the second electronic device 309 may be in communication with a GPS satellite 306 transmitting a GPS signal to the first electronic device 302 or the second electronic device 309.

It should be expressly understood that implementations for the first electronic device 302 or the second electronic device 309, the communication link (not shown) and the communications network 314 are provided for illustration purposes only. As such, those skilled in the art will easily appreciate other specific implementational details for the first electronic device 302 or the second electronic device 309, the communication link (not shown) and the communications network 314. As such, by no means, examples provided herein above are meant to limit the scope of the present technology.

Also coupled to the communication network 314 is the ridesharing platform 360. In some embodiments, the ridesharing platform 360 may be enabled by one or more servers 340, 342 and 344. The servers 340, 342, 344 can be implemented as conventional computer servers. In an example of an embodiment of the present technology, the servers 340, 342, 344 can be implemented as Dell™ PowerEdge™ Servers running the Microsoft™ Windows Server™ operating system. Needless to say, the servers 340, 342, 344 can be implemented in any other suitable hardware and/or software and/or firmware or a combination thereof. In the depicted non-limiting embodiment of present technology, the servers 340, 342, 344 define a distributed architecture relying on multiple servers. In alternative non-limiting embodiments of the present technology, the functionality of the servers 340, 342, 344 may be on a single server.

One or more of the servers 340, 342, 344 operates a ridesharing platform 360. In the illustrated example of FIG. 2, the ridesharing platform 360 comprises a set of software modules 370, a user database 352, a trip database 354 and a meeting points database 356. The general purpose of the ridesharing platform 360 is to allow drivers and/or passenger (1) creating and publishing new trips, (2) searching and identifying trips relevant to a given passenger and (3) communicating and completing a transaction between a passenger and a driver. In an exemplary embodiment, the set of modules 370 comprises a driver interface 372, a passenger interface 374, a trip creation processing module 376, a rideshare request processing module 378, a routing engine 380 and a trip search engine 382. As it will be understood by a person skilled in the art of the present technology, modules of the set of modules 370 are provided as an example and many variations may be therefore envision without departing from the scope of the present technology. This aspect should not be construed as being limitative of the scope of the present technology.

In the exemplified embodiment, the driver interface 372 may embody functions allowing the receipt and processing of information from a driver's device (e.g., the first electronic device 302). As an example, such information may comprise a driver position, a driver arrival position, a deviation threshold reflective of an acceptable deviation from an original route between the driver departure position and the driver arrival position. The acceptable deviation may be provided via multiple ways, such as, but not limited to, a detour duration acceptance, a maximal detour duration, a maximal detour distance, a minimal duration with a passenger and a minimal distance with a passenger. In some embodiments, the acceptable deviation may be provided as an absolute value (e.g., a number of kilometers, a duration in seconds, minutes or hours, etc) and/or as a relative value (e.g., a percentage). In some embodiments, the deviation threshold may be directly provided by the driver or may be computed based on information provided by the driver. In some embodiments, the information may also comprise a departure date and time, a number of available seats and a price by seat. In some embodiments, the information received via the driver interface 372 may be transmitted to a trip creation processing module 376 and/or stored in the user database 352 and/or in the meeting points database 356.

The trip creation processing module 376 may generate trip data based on the information received from the driver interface 372. In some embodiments, the trip data may be associated with the driver departure position and the driver arrival position. In some embodiments, the trip data may be associated with one or more meeting point. In some embodiments, the trip creation processing module 376 may also generate an original route by causing to compute an original polyline defining the original route. In some embodiments, the trip creation processing module 376 transmits data to a routing engine 380. Such data may include instructions received via the driver interface 372, for example, the driver departure position and/or the driver arrival position.

The routing engine 380 may be implemented as a routing engine which may generate an itinerary defined by a polyline extending from the driver departure position and the driver arrival position. The routing engine may be implemented according to known methods which may become apparent to the person skilled in the art of the present technology. The routing engine may be configured according to different settings which may or may not be modified by the driver. For example, the driver may apply settings so that the routing engine may generate an itinerary according to a shortest distance between the driver departure position and the driver position. In yet another example, the driver may apply settings so that the routing engine may generate an itinerary limiting costs associated with tolls which may be located along the itinerary. Other examples may be also envisioned. In some embodiments, the settings may be associated with the driver and stored in the user database 352. Examples of polylines generated by the routing engine 380 will be further exemplified in connection with FIGS. 6 to 11. Even though the routing engine 380 is represented as being part of the ridesharing platform 360, it should be understood that the routing engine 380 may be hosted on remote server and/or define a routing engine independent from the ridesharing platform 360.

In some embodiments, the trip creation processing module 376 may also access the meeting points database 356. As it will be further detailed in connection with FIG. 5, the meeting points database 356 comprises data relating to meeting points which may be broadly defined as meeting points which may be convenient for both a driver and a passenger. In some embodiments, the trip creation processing module 376 determines which meeting points from the meeting points stored in the meeting points database 356 are within a distance from the polyline generated by the routing engine 380. This step may allow reducing a number of candidate meeting points for which further calculation will be required by disregarding meeting points which are beyond a certain distance from the polyline.

Once the trip creation processing module 376 has determined which meeting points from the meeting points database 356 are candidate meeting points, the trip creation processing module 376 proceeds to generating detour routes for the candidate meetings points. In some embodiments, a detour route may be broadly defined as an alternate itinerary extending from the driver departure position to the driver arrival position and crossing a given meeting point. In some embodiments, the detour route is defined by a detour polyline generated by the routing engine. In some embodiments, the detour route is associated with a detour distance which may then be compared to an original route distance. In yet some embodiments, the detour route is associated with a detour trip duration which may then be compared to an original route duration. The trip creation processing module 376 may identify selected candidate meeting points from the candidate meeting points by comparing the original route with each one of the generated detoured routes. The trip creation processing module 376 may then proceed to storing the selected candidate meeting points along with other information relating to a trip in the trip database 354. The selected candidate meetings points may then be relied upon receiving a request from a passenger thereby speeding up processing of the request as trips of the trip database has been previously associated with meeting points which are deemed to be acceptable for their respective drivers.

In some embodiments the trip creation processing module 376 is said to "precompute" data, such as by associating trips with selected meeting points. Reference to "precomputation" may be made, in some embodiments, to illustrate that the trips and selected meeting points are associated before a rideshare request is processed by the rideshare request processing module 378, thereby accelerating processing of the rideshare request.

Turning now to the passenger interface 374, the passenger interface 374 may embody functions allowing the receipt and processing of information defining one or more rideshare request received from a passenger's device, such as the second electronic device 309. As an example, such information may comprise a search departure position, a search arrival position. In some embodiments, the information may also comprise a departure date and time, a number of available seats and a price by seat. In some embodiments, the information received via the passenger interface 372 may be transmitted to the rideshare request processing module 378.

Even though illustrated as two distinct software modules, the driver interface 372 and the passenger interface 374 may, in some embodiments, also define a single interface. Also, in some embodiments, the driver interface 372 and/or the passenger interface 374 may also be configured to receive information relating to a user profile. The user profile may be a driver profile and/or a passenger profile. Information relating to the user profile may be processed by a user profile module (not shown) and stored in the user database 352. As a person skilled in the art of the present technology will appreciate, multiple variations as to how the driver interface 372 and the passenger interface 374 may be implemented may be envisioned without departing from the scope of the present technology.

The rideshare request processing module 378 may embody functions allowing to identify trips, via a trip search engine 382, which are relevant to a given rideshare request. In some embodiments, the trip search engine 382 is configured so as to access the trip database 354 and select candidates trips from the trips of the trip database 354 that are to be presented to the potential passenger who formulated the rideshare request. In some embodiments, the selection may be based on criteria such as a departure date and time, a number of required seats, a detour duration, a detour distance and/or a price by seat. The criteria may therefore allow the trip search engine 382 to disregard trips that are not (or not likely) to be a match with the rideshare request.

Also, in some embodiments, the trip search engine 382 may select the candidate trips based on a comparison of the search departure position and/or the search arrival position with selected meeting points associated with trips. In some embodiments, the comparison aims at determining whether a given selected meeting point is within a distance from the search departure position and/or the search arrival position. The distance may be parameterized distance or may be adjusted dynamically based on multiple criteria, such as, but not limited to, a distance between the search departure position and the search arrival position.

In some embodiments, a comparison of the search departure position and/or the search arrival position with selected meeting points associated with trips allows identifying candidate trips without having to compute a detour route for each one of the candidate trips to determine whether a meeting point would be acceptable (or not) for a driver associated with a given trip. Amongst many other benefits, this allows increasing a performance of the trip search engine 382 thereby (1) allowing a faster response time for providing results in response to a rideshare request from a potential passenger and/or (2) reducing a processing power required to identify candidate trips based on a large volume of trips stored in the trip database 354.

Other variations as to which criteria the trip search engine 382 may be using may also be envisioned. For example, in some embodiments, additional criteria may be taken into consideration by the trip search engine 382. For example, the trip search engine 382 may implement search logic which requires that a minimal distance with a passenger required by a driver associated with a given trip may have to be lower than a realistic distance between the search departure position and the search arrival position. In some embodiments, the minimal distance and the realistic distance may be absolute values (e.g., a number of kilometers) or relative values (e.g., a percentage of a distance of a trip). In yet other examples, the trip search engine 382 may implement search logic which requires that a minimal duration with a passenger required by a driver associated with a given trip may have to be lower than a realistic duration between the search departure position and the search arrival position. In some embodiments, the minimal duration and the realistic duration may be absolute values (e.g., a number of minutes) or relative values (e.g., a percentage of total trip duration).

Once the trip candidates are identified by the trip search engine 382, the trip search engine 382 may transmit the candidate trips for displaying to the potential passenger via the passenger interface 374. In some embodiments, the trip search engine 382 may transmit the candidate trips to the rideshare request processing module 378 which, in turn, transmit them for displaying to the potential passenger via the passenger interface 374. In some embodiments, the rideshare request processing module 378 may be part of the trip search engine 382. As a person skilled in the art of the present technology may appreciate, how the rideshare request processing module 378 and the trip search engine 382 are arranged and where they are hosted are not critical to the purpose of the present technology and multiple variant may be envisioned without departing from the scope of the present technology.

Figure 3:
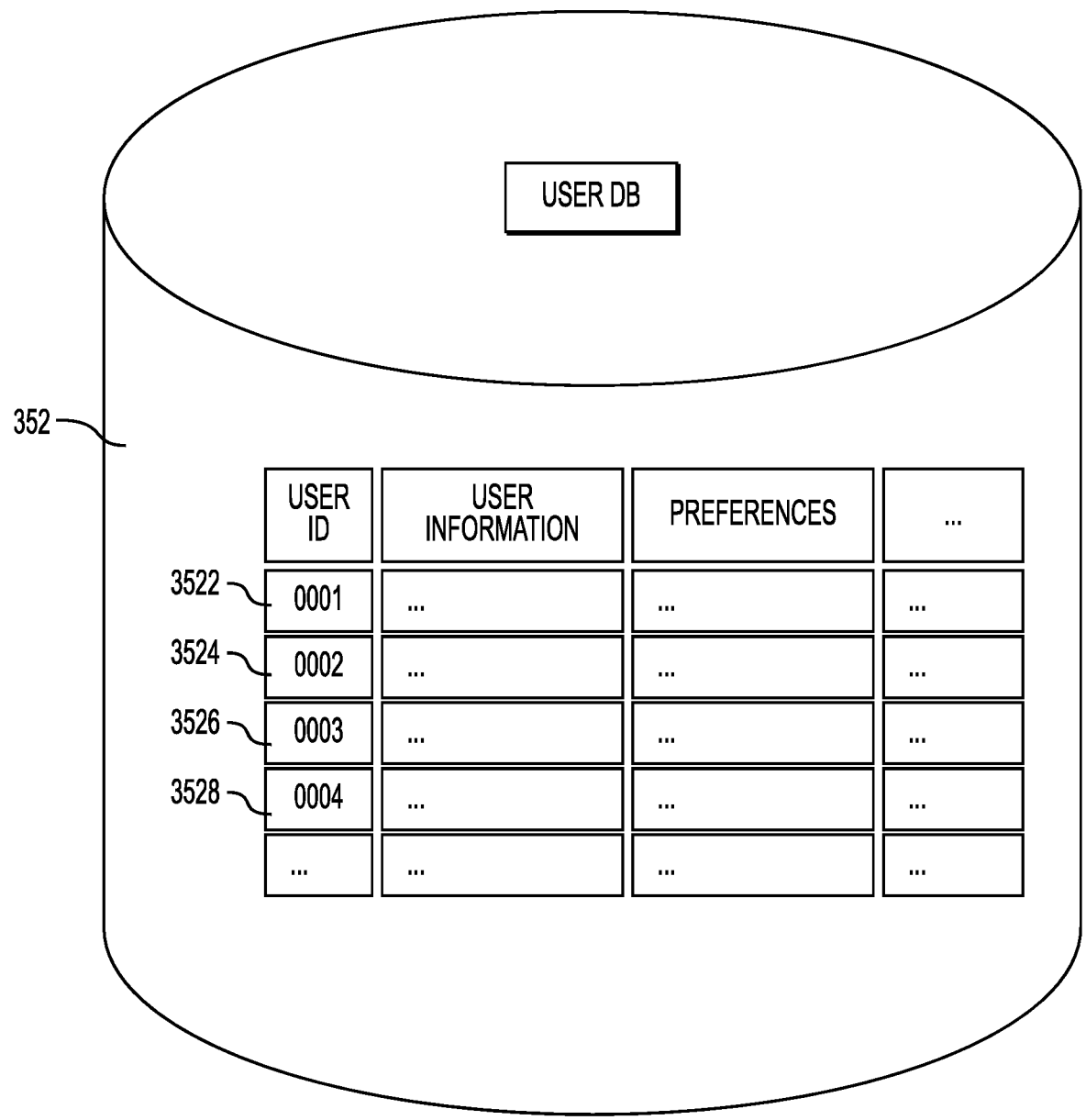
FIG. 3 is a diagram of a first database in accordance with an embodiment of the present technology.

Turning now to FIG. 3, an example of a data structure of the user database 352 is illustrated. In this example, the data structure comprises multiple rows, each one of the rows allows storing of data relating to a user. In the given example, the user database 352 comprises four users, each associated with a unique user ID, namely "0001" referred to as 3522, "0002" referred to as 3524, "0003" referred to as 3526 and "0004" referred to as 3528. Each one of the users may be a driver and/or a passenger. Each one of the rows may allow storing information such as user information, preferences, etc. In some embodiments, the user database 352 may comprise enough information so as to enable a social network allowing users to interact amongst themselves, share information and conduct financial transactions via the ridesharing platform 360. As a person skilled in the art of the present technology may appreciate, the example of the user database 352 should not be construed as being limitative and others data rows and/or types of information may be stored therein without departing from the scope of the present technology.

Figure 4:
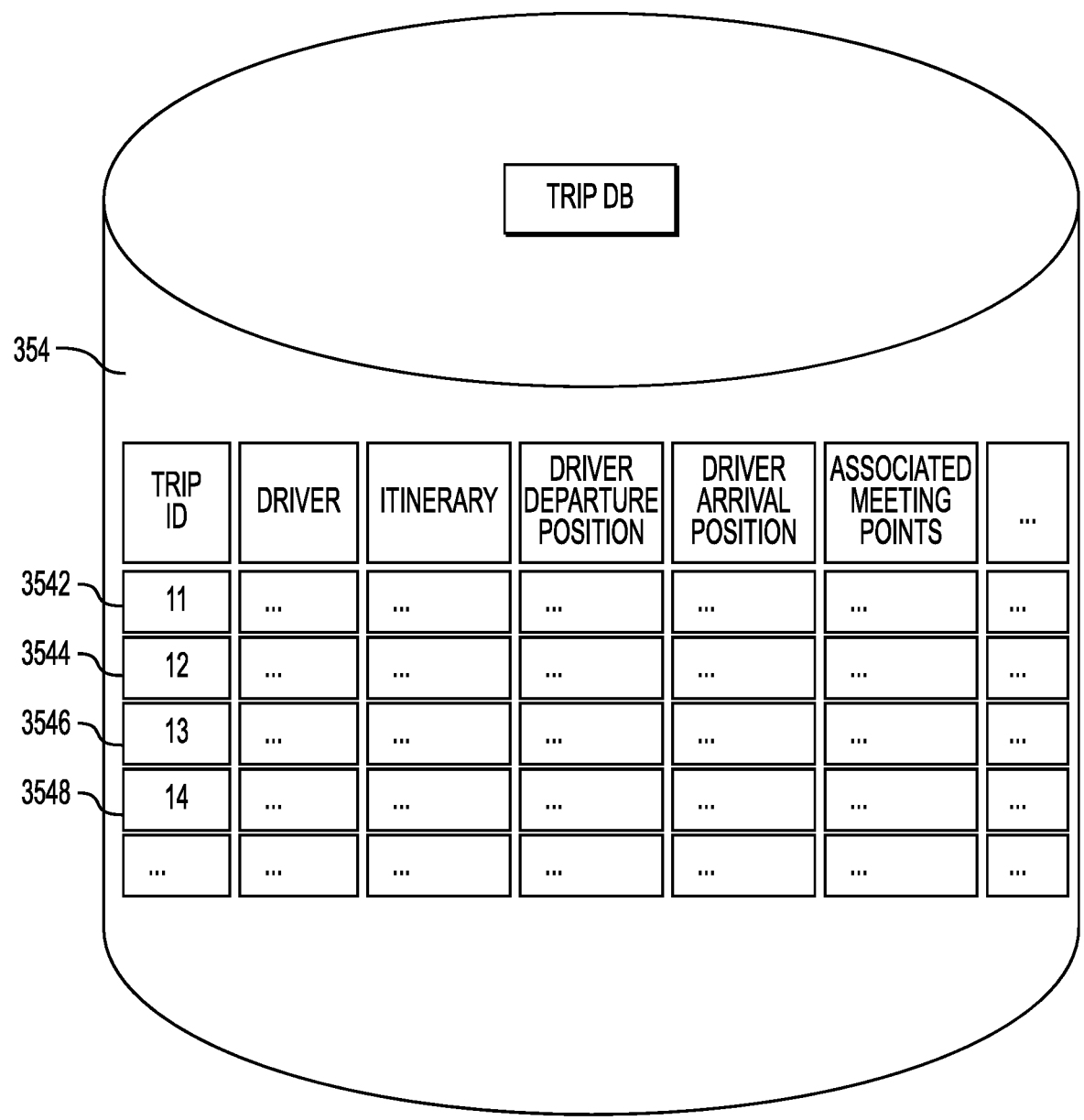
FIG. 4 is a diagram of a second database in accordance with an embodiment of the present technology.

Turning now to FIG. 4, an example of a data structure of the trip database 354 is illustrated. In this example, the data structure comprises multiple rows, each one of the rows allows storing of data relating to a trip. The trip database 354 allows storing of trip data such as, for a given trip, a unique trip ID, a driver associated with the given trip (which may be a key to the user database 352), an itinerary (which may be defined by multiple geographical coordinates, including waypoints located between a driver departure position and a driver arrival position), a driver departure position (which may be defined by geographical coordinates), a driver arrival position (which may be defined by geographical coordinates), meeting points associated with a given trip, a deviation threshold, etc. In some embodiments, the deviation threshold may comprise a boolean identifying whether the driver accepts a detour or not. In some embodiments, the deviation threshold may also comprise maximal detour duration, a maximal detour distance, a minimal duration with a passenger and/or a minimal distance with a passenger. In some embodiments, the maximal detour duration, the maximal detour distance, the minimal duration with a passenger and/or the minimal distance with a passenger may be absolute (e.g., a distance in kilometers, a duration in seconds, minutes or hours, etc) or relative (e.g., a percentage of a distance and/or of a duration). In some embodiments, a trip may also be associated with an original route (which may be, in some embodiments, be referred to as an itinerary).

In some embodiments, the original route may comprise various parameters associated with a geographical coordinate system defining a trajectory/itinerary. In some embodiments, the trajectory/itinerary may be defined by a polyline (also referred to as an original polyline in the case of a polyline defining an original route) associated with a same geographical coordinate system as the one associated with the meeting points of the meeting points database 356. In some embodiments, the polyline may be computed by a routing engine, such as the routing engine 380. In some embodiments, the routing engine 380 may also compute a realistic duration and/or a driver realistic distance which may also be generated by a routing engine. In some embodiments, the adjective "realistic" refers to a distance and/or a duration which may be an estimate of a distance and/or duration the driver will/shall expect in real-life. This in contrast with distances and/or durations which values do not reflect what would happen in real-life. In the illustrated embodiment, the trip database 354 comprises four trips, each associated with a unique trip ID, namely "11" referred to as 3542, "12" referred to as 3544, "13" referred to as 3546 and "14" referred to as 3548. As a person skilled in the art of the present technology may appreciate, the example of the trip database 354 should not be construed as being limitative and others data rows and/or types of information may be stored therein without departing from the scope of the present technology.

Figure 5:
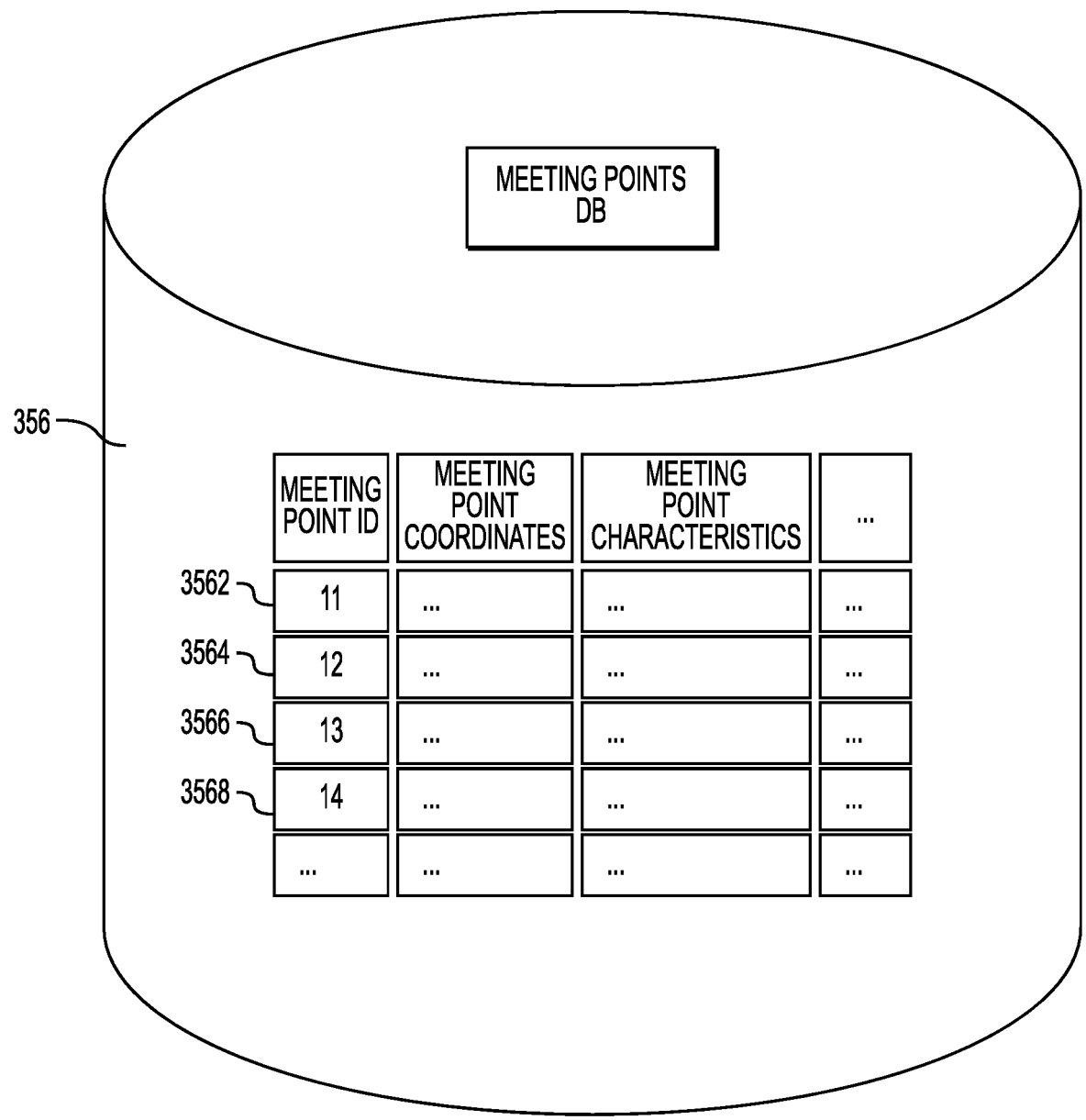
FIG. 5 is a diagram of a third database in accordance with an embodiment of the present technology.

Turning now to FIG. 5, an example of a data structure of the meeting points database 356 is illustrated. In this example, the data structure comprises multiple rows, each one of the rows allows storing of data relating to a meeting point. The data relating to the meeting points stored in the meeting points database 356 may have been generated based on clustering past driver departure positions and/or past driver arrival positions and/or collecting data from users of the ridesharing platform 360 and/or an external database. In some embodiments, the external database may comprise information relating to various categories of meeting points such as, but not limited to, gas stations, highway tolls, etc. In some embodiments, data collected from the users of the ridesharing platform 360 may be curated. The meeting points database 356 may be relied upon by the trip creation processing module 376 so as to determine which meeting points from the meeting points database 356 may be candidate meeting points to be associated with a given trip. In the example of FIG. 5, the meeting points database 356 may store various information, such as, for a meeting point, a unique meeting point ID, meeting point coordinates defined based on a geographical coordinate system (such as, but not limited to, a system comprising a latitude and a longitude) and meeting point characteristics. In some embodiments, the meeting point characteristics may allow classification of a given meeting point (e.g., the meeting point is a parking lot, a gas station, etc.) and/or provide additional information provided by users of the ridesharing platform 360, such as, but not limited to, a rating of the meeting point. In some embodiments, a given meeting point ID of the meeting points database 356 may be relied upon to identify a given meeting point to be identified with a given trip of the trip database 354.

In the illustrated embodiment, the meeting points database 356 comprises four meeting points, namely "11" referred to as 3562, "12" referred to as 3564, "13" referred to as 3566 and "14" referred to as 3568. As a person skilled in the art of the present technology may appreciate, the example of the meeting points database 356 should not be construed as being limitative and others data rows and/or types of information may be stored therein without departing from the scope of the present technology. In addition, even though the trip database 354 and the meeting points database 356 are represented as two distinct databases, it should be understood that they can form a single database which may be referred to a trip database. Other variations are also possible and will become apparent to the person skilled in the art of the present technology.

Figure 6:
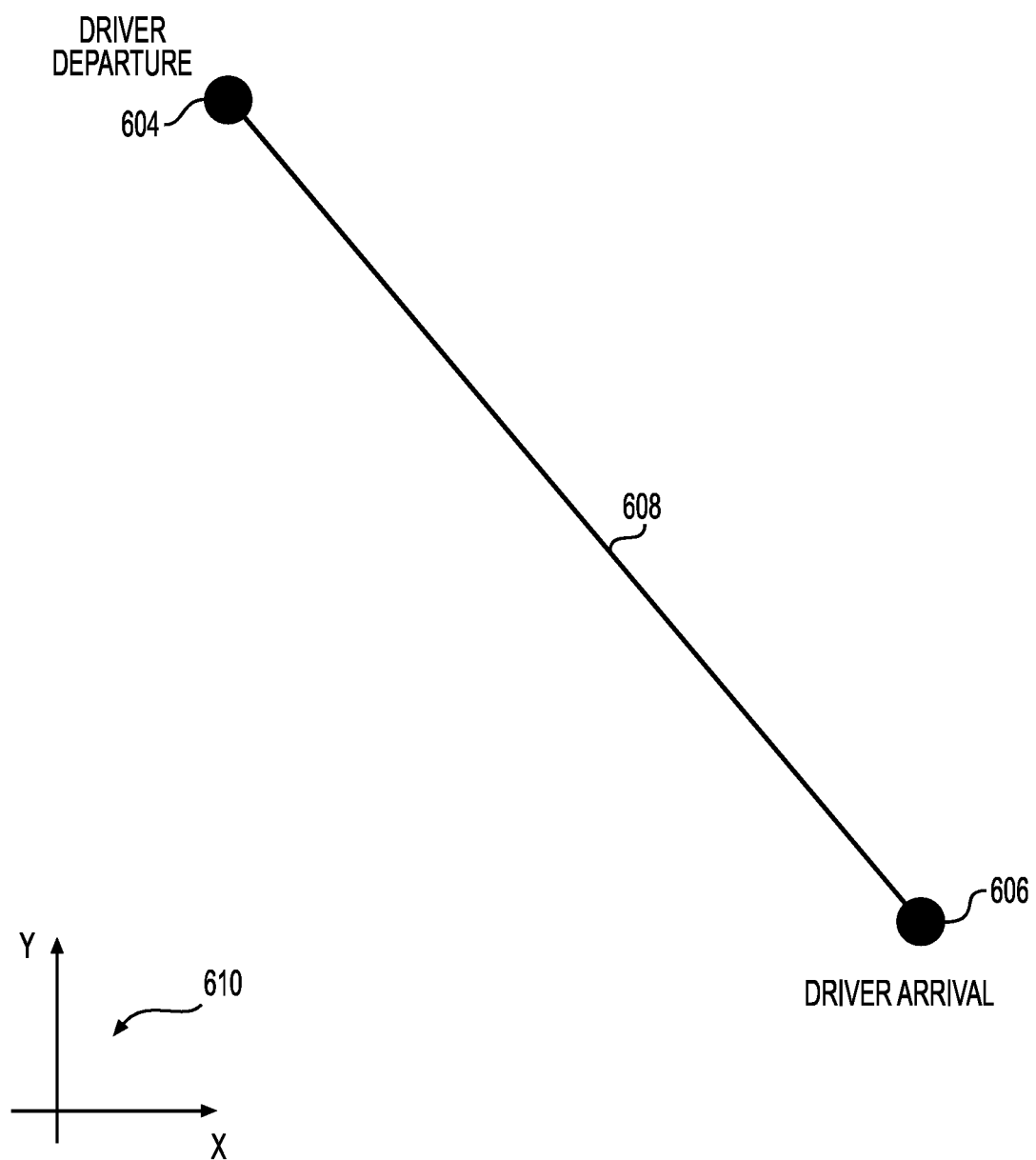
FIGS. 6 to 11 are diagrams illustrating operations in accordance with various embodiments of the present technology.

Turning now to FIG. 6, an example of a polyline 608 is exemplified. In this embodiment, the polyline 608 defines an original route extending from a driver departure 604 to a driver arrival 606. For ease of understanding, the polyline 608 is represented as a straight line extending from the driver departure 604 to the driver arrival 606. It should be understood that a polyline may not be limited to a straight line. To the contrary, a polyline may comprise multiple segments, each segment representing a sub-portion of an itinerary. Depending of a level of granularity of the routing engine 380 and a length of an itinerary, a polyline may comprise hundreds of segments. In some embodiments, the polyline may be associated with a geographical coordinate system such a coordinate system 610 defined along too axis X and Y. Other geographical coordinate systems may also be envisioned without departing from the scope of the present technology.

Figure 7:
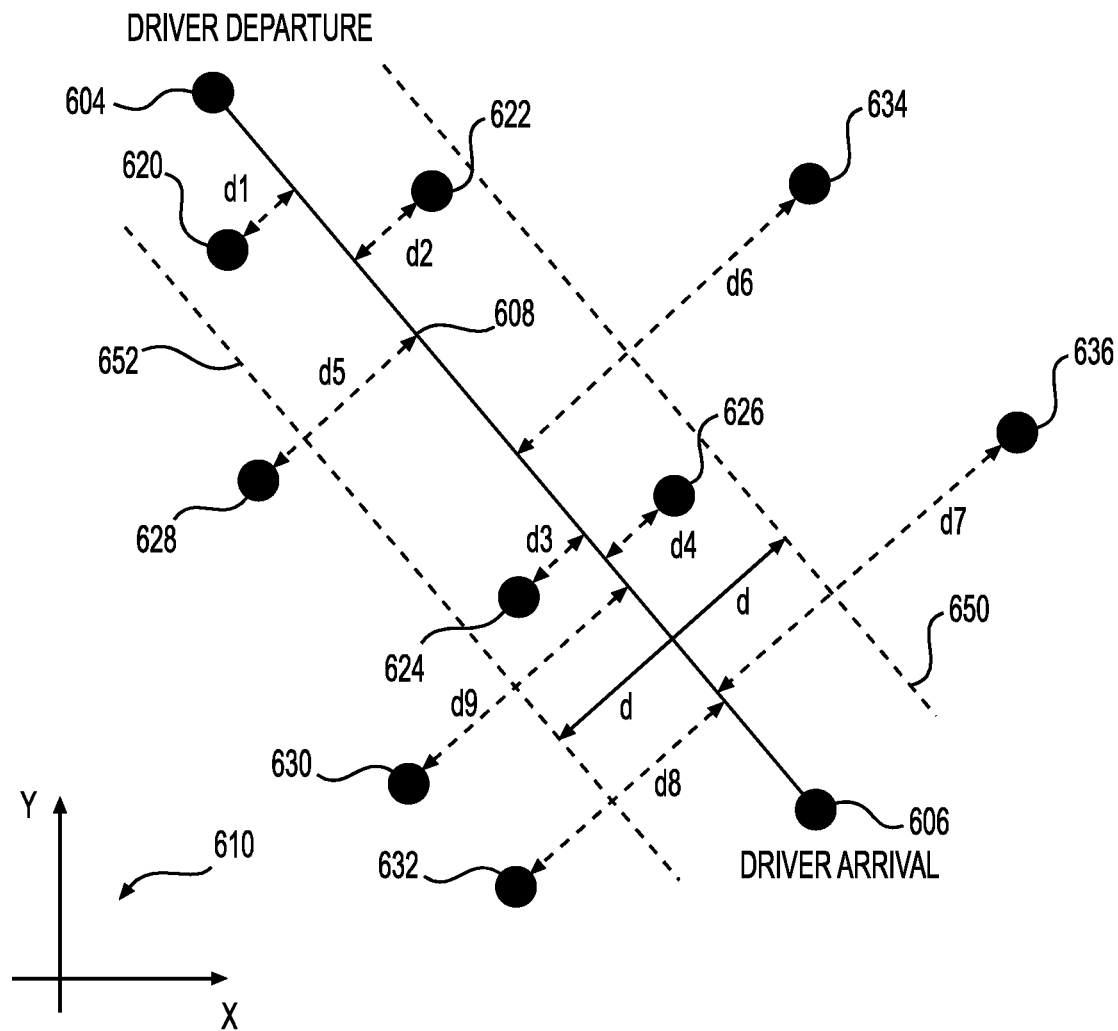

Turning now to FIG. 7, an example of how candidate meeting points are determined is illustrated. As detailed above with respect to FIG. 6, the polyline 608 extends from the driver departure 604 to the driver arrival 606. Meeting points 620, 622, 624, 626, 628, 630, 632, 634 and 636 are also illustrated. Each one of the meeting points is associated with different geographical coordinates which are reflected by specific locations of each one of the meeting points. The meeting points may have been accessed from the meeting points database 356. Additionally, two dotted lines 650 and 652 are illustrated. The dotted lines 650 and 652 illustrates an example of how a determination of candidate meeting points may be implemented. This example should not be construed as being limitative and multiple variations may be envisioned. In the illustrated embodiments, determination is based on a distance between the polyline and each one of the meeting points. If the distance is less (or equal) to the distance d represented by the dotted lines 650 and 652, then determination is made that the corresponding meeting point is a candidate meeting point for which a detour polyline is to be computed. For examples, the meeting points 620 (associated with a distance d1), 622 (associated with a distance d2), 624 (associated with a distance d3) and 626 (associated with a distance d4) may be determined as being candidate meeting points. To the contrary, if the distance is more than the distance d represented by the dotted lines 650 and 652, then determination is made that the corresponding meeting point is not a candidate meeting point for which a detour polyline is to be computed. For example, the meeting points 628 (associated with a distance d5), 630 (associated with a distance d9), 632 (associated with a distance d8), 634 (associated with a distance d6) and 636 (associated with a distance d7) may be determined as not being candidate meeting points.

Figure 8:
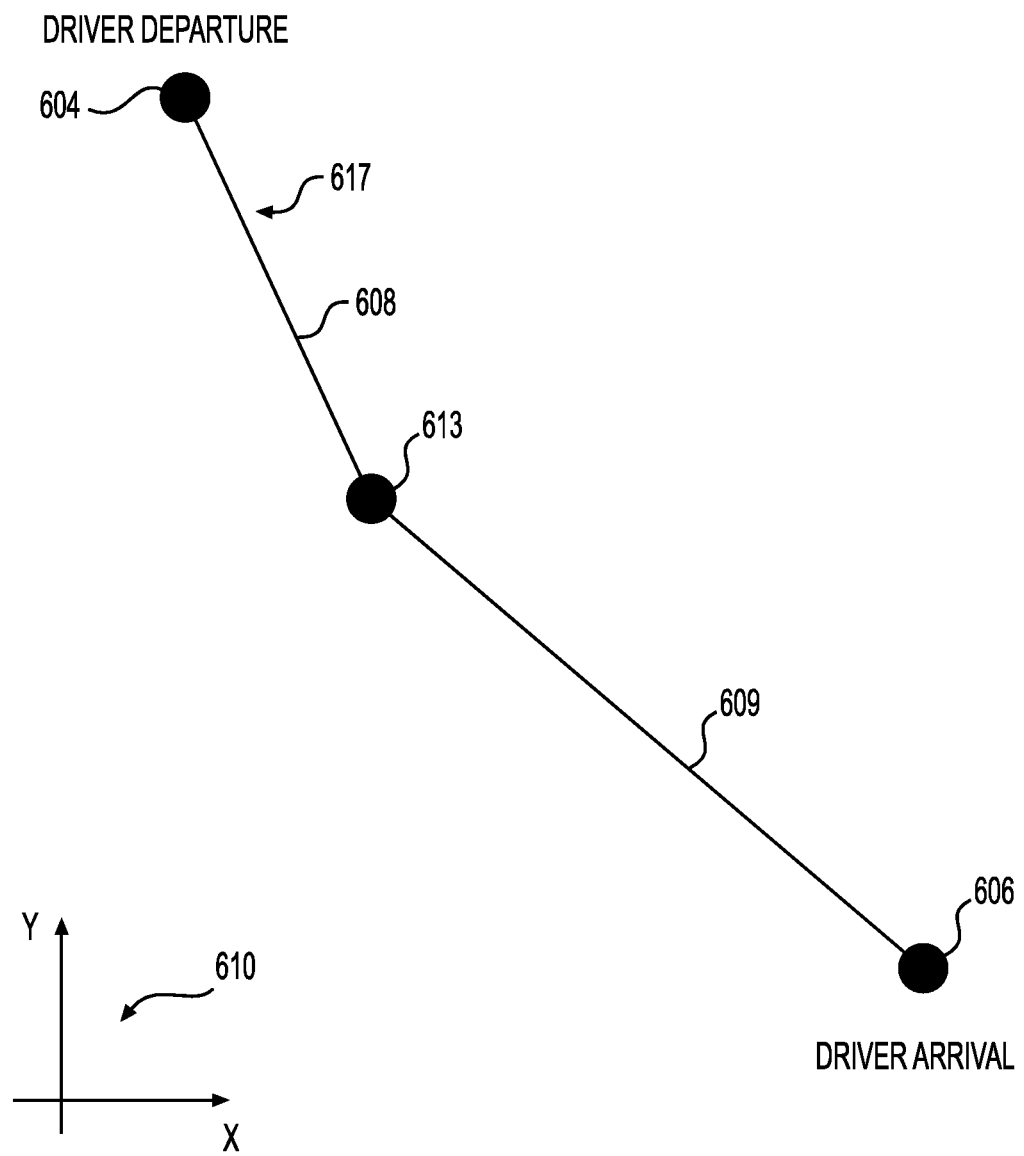

Turning now to FIG. 8, a second exemplary polyline 617 is illustrated. The polyline 617 comprises a first segment 608 extending from the driver departure 604 to a waypoint 613 and a second segment 609 extending from the waypoint 613 to the driver arrival 606. In some embodiments, the waypoint may be a location that a driver has specially chosen so that an itinerary (and therefore the polyline 617) goes through the location. In some embodiments, the waypoint may be a specific city the driver would like to go through, a meeting point chosen by the driver, a stopover chosen by the driver, etc. In some embodiments, the first segment 608 and the second segment 609 each comprises multiple segments defining the polyline 617.

Figure 9:
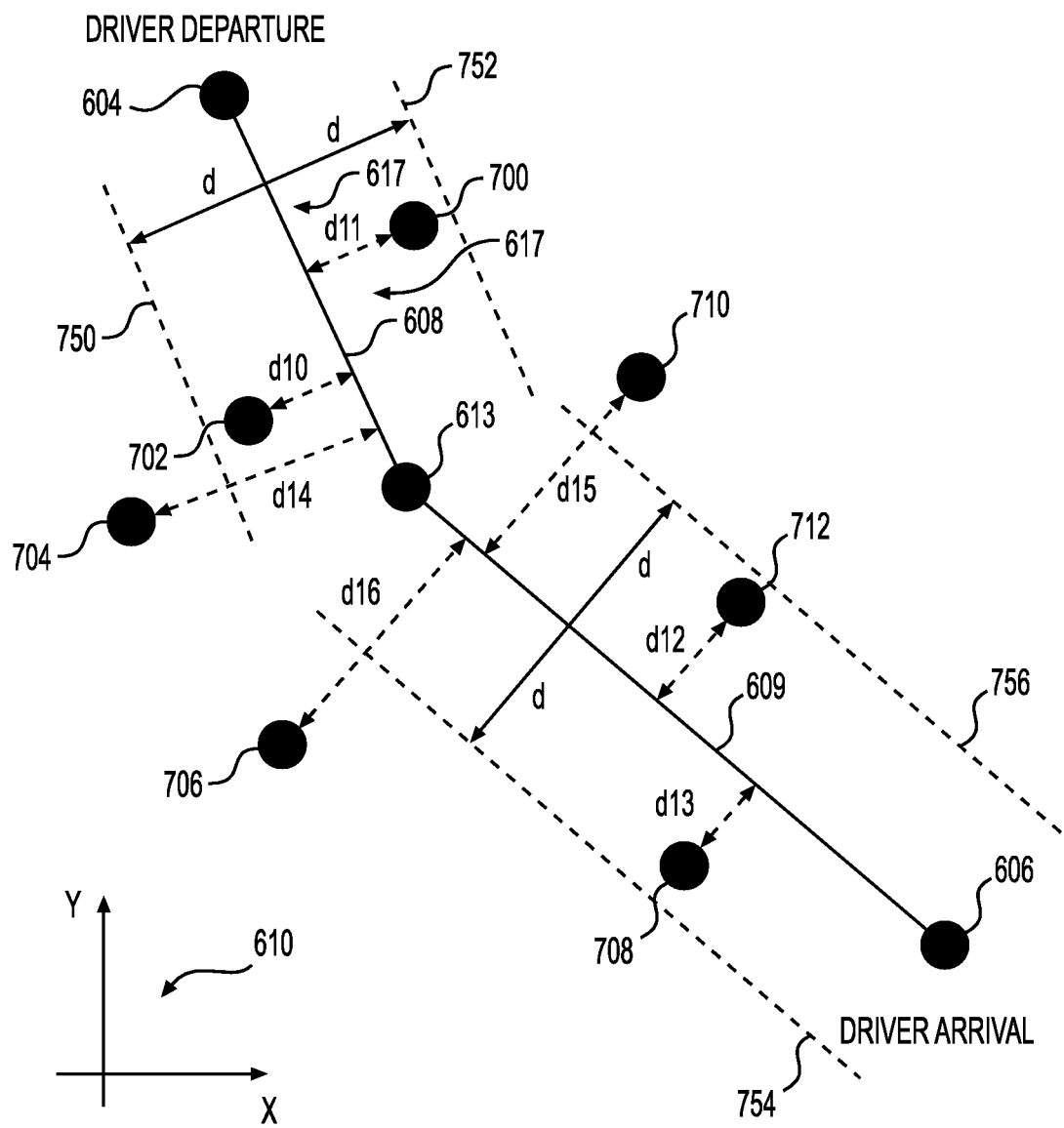

FIG. 9 illustrates another example of how candidate meeting points are determined. As detailed above with respect to FIG. 8, the polyline 617 extends from the driver departure 604 to the driver arrival 606 through the waypoint 613. Meeting points 700, 702, 704, 706, 708, 710, and 712 are also illustrated. Each one of the meeting points is associated with different geographical coordinates which are reflected by specific locations of each one of the meeting points. The meeting points may have been accessed from the meeting points database 356. Additionally, two dotted lines 750 and 752 and two dotted lines 754 and 756 are illustrated. As for the example of FIG. 7, determination is based on a distance between the polyline and each one of the meeting points. If the distance is less (or equal) to the distance d represented by the dotted lines 750 and 752 and the dotted lines 754 and 756, then determination is made that the corresponding meeting point is a candidate meeting point for which a detour polyline is to be computed. For examples, the meeting points 700 (associated with a distance d11), 702 (associated with a distance d10), 708 (associated with a distance d13) and 712 (associated with a distance d12) may be determined as being candidate meeting points. To the contrary, if the distance is more than the distance d represented by the dotted lines 750 and 752 and the dotted lines 754 and 756, then determination is made that the corresponding meeting point is not a candidate meeting point for which a detour polyline is to be computed. For example, the meeting points 704 (associated with a distance d14), 706 (associated with a distance d16) and 710 (associated with a distance d15) may be determined as not being candidate meeting points. In the illustrated embodiments, distances d between the dotted lines 750 and 752 and the polyline 617 and the dotted lines 754 and 756 and the polyline 617 are the same. However, alternative embodiments may be envisioned wherein a first distance is associated with the first segment 608 and a second distance is associated with the second segment 609. The first distance and the second distance may be manually set by the driver and/or determined by the ridesharing platform, for example, but not limited to, based on a distance between the driver departure and the waypoint and a distance between the waypoint and the driver arrival. Other variations may also be envisioned.

Figure 10:
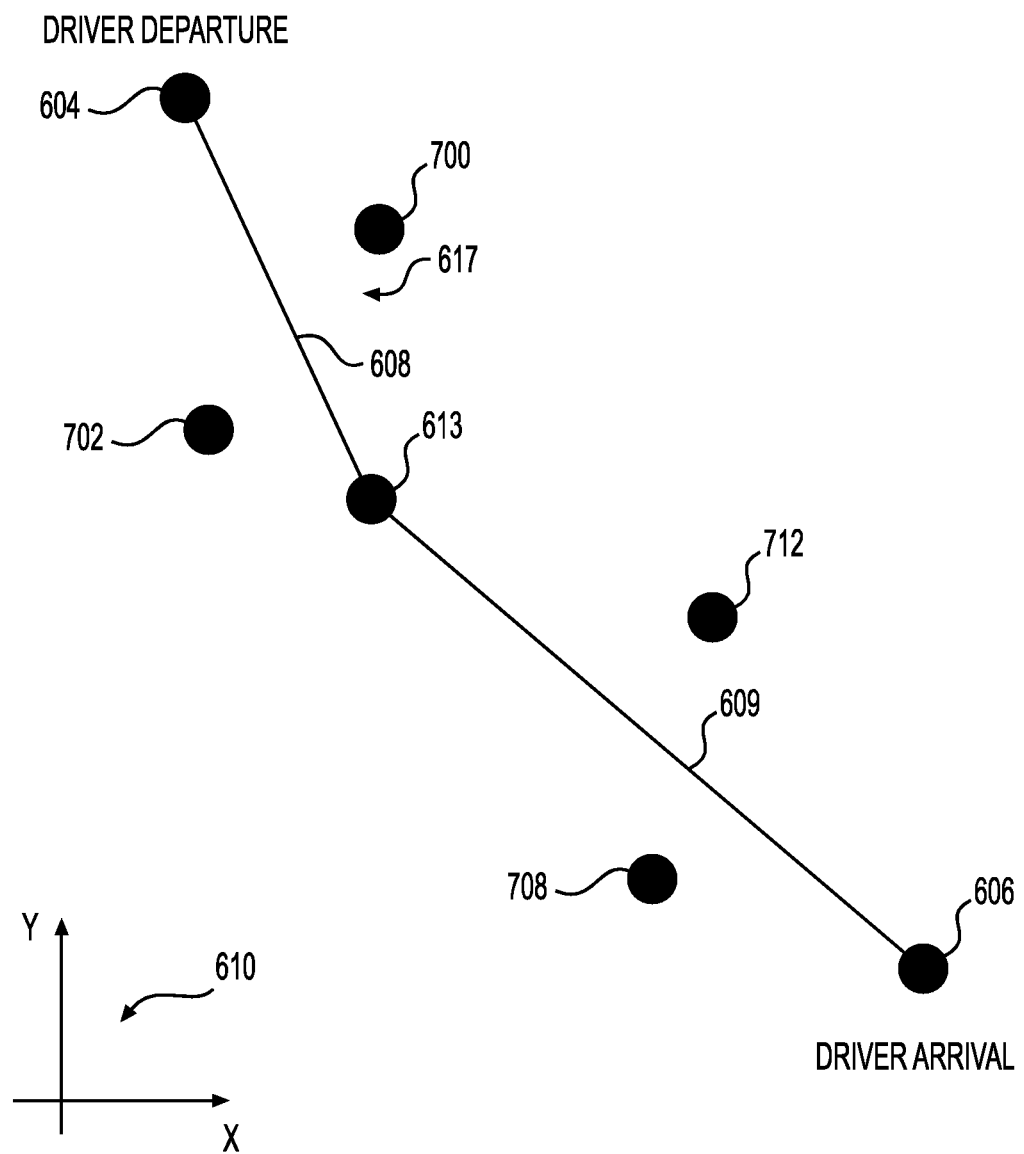

FIG. 10 illustrates the candidate meeting points 700, 702, 708 and 712 of FIG. 9 for which detour routes defined by detour polylines are to be generated.

Figure 11:
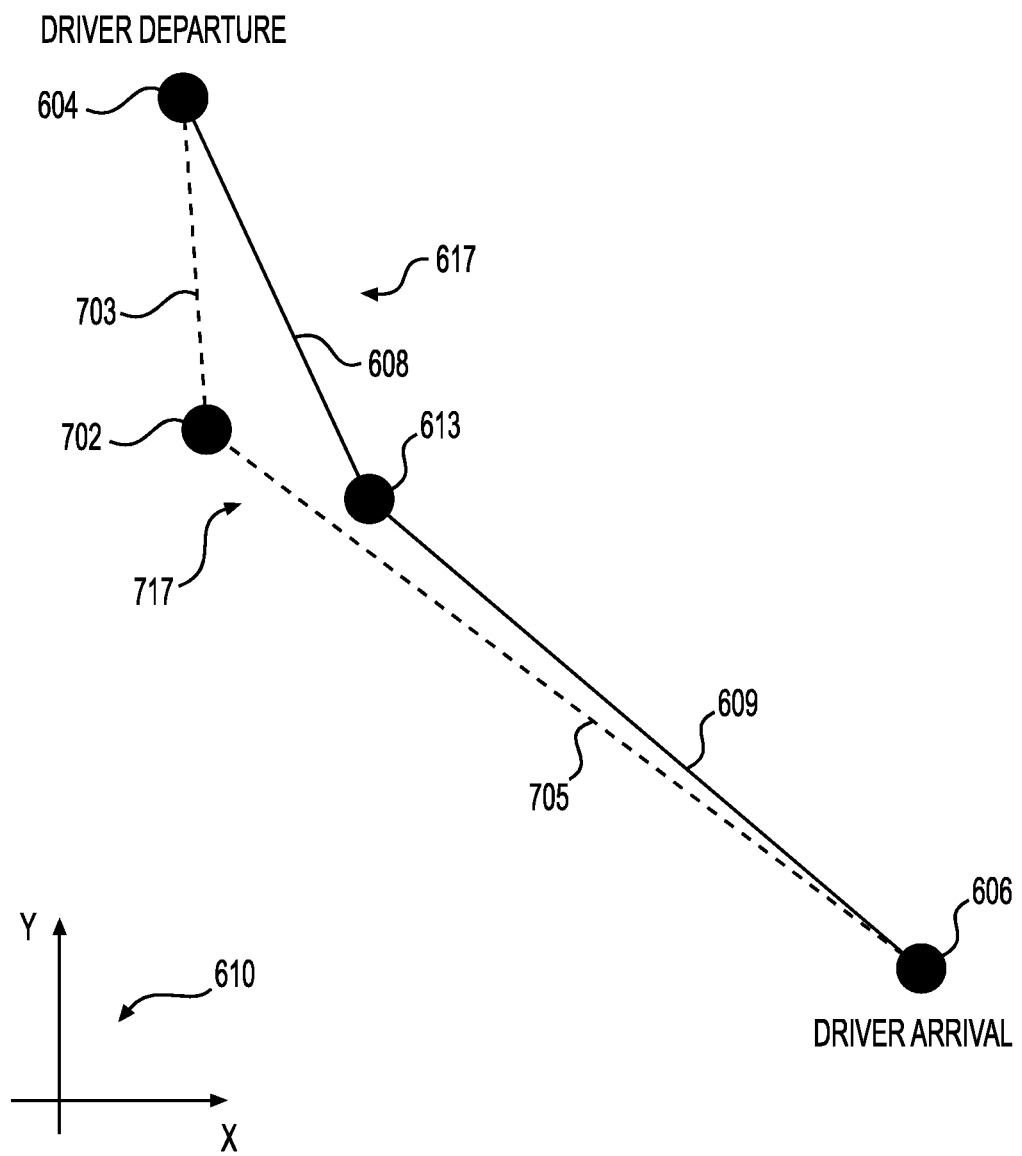

FIG. 11 illustrates an example of a detour route defined by a detour polyline 717. As illustrated, the detour polyline 717 comprises a first segment 703 extending from the driver departure 604 to the meeting point 702 and a second segment 705 extending from the meeting point 702 to the driver arrival 606. In some embodiments, the detour polyline 717 defines the detour route going through the meeting point. In some embodiments, the detour polyline 717 may be used to generate (1) a detour route distance and/or (2) a detour route duration. In some embodiments, the detour route distance and/or the detour route duration may be generated by the routing engine 380 and may then be associated with the detour route. In some embodiments, the detour route distance and/or the detour route duration may be compared to an original route distance and/or original route duration associated with the original route defined by the original polyline 617. Then, based on this comparison, the ridesharing platform 360 may determine whether the detour route distance and/or the detour route duration are below (or equal to) a deviation threshold associated with the trip and/or the driver. If it is the case, then the meeting point 702 may be identified as being a selected candidate meeting point to be associated with the trip. The selected candidate meeting point may then be stored in the trip database 354 so that the association between the selected candidate meeting point and the trip may be later retrieved.

Figure 12:
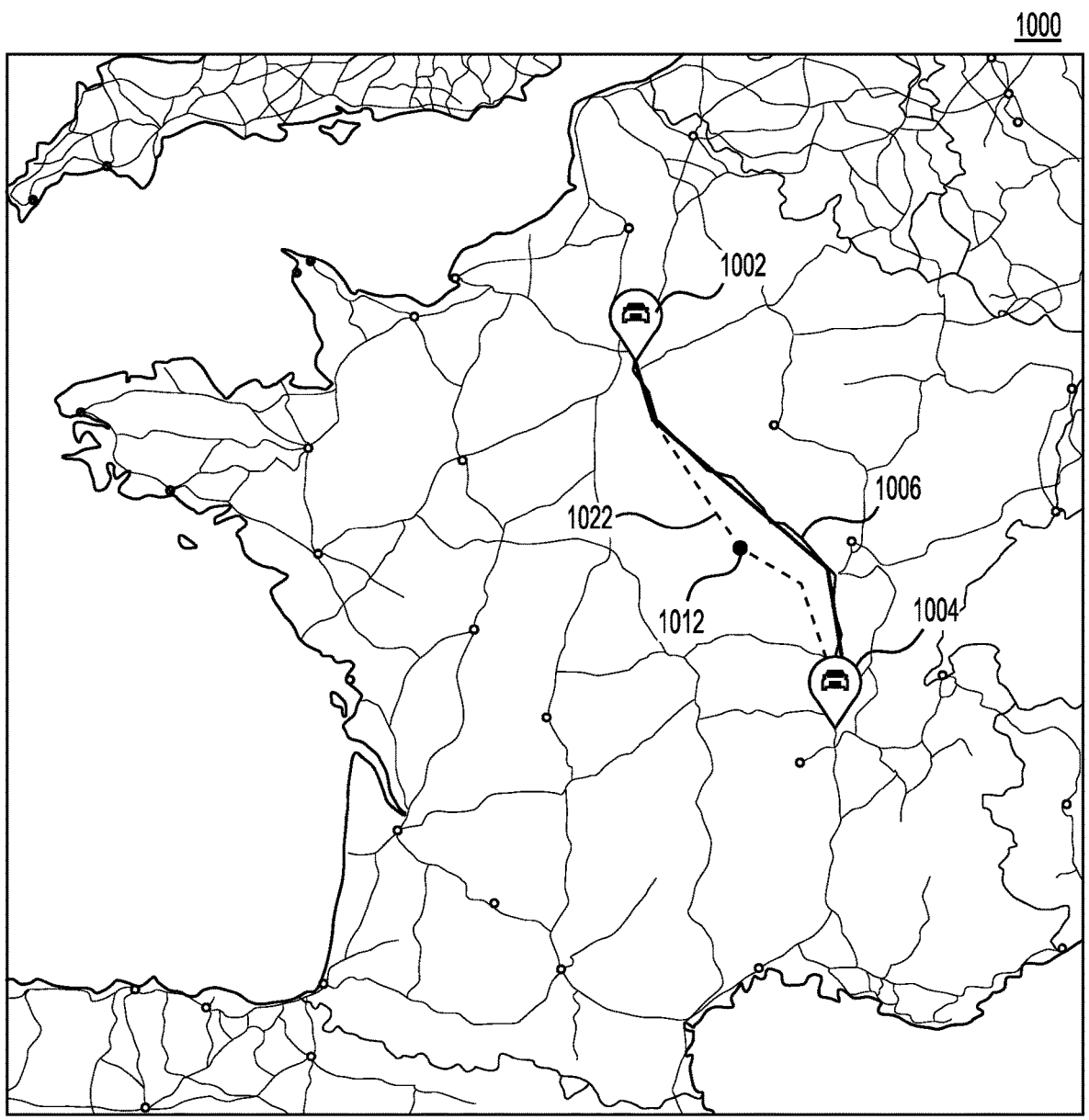
FIG. 12 illustrates an example of operations conducted in accordance with an embodiment of the present technology.

Turning now to FIG. 12, an example of an original route defined by an original polyline 1006 extending from a driver departure 1002 (e.g., Paris) to a driver arrival 1004 (e.g., Lyon) is illustrated. A detour route defined by a detour polyline 1022 extending from a driver departure 1002 (e.g., Paris) to a meeting point 1012 and then from the meeting point 1012 to a driver arrival 1004 (e.g., Lyon) is also illustrated.

Figure 13:
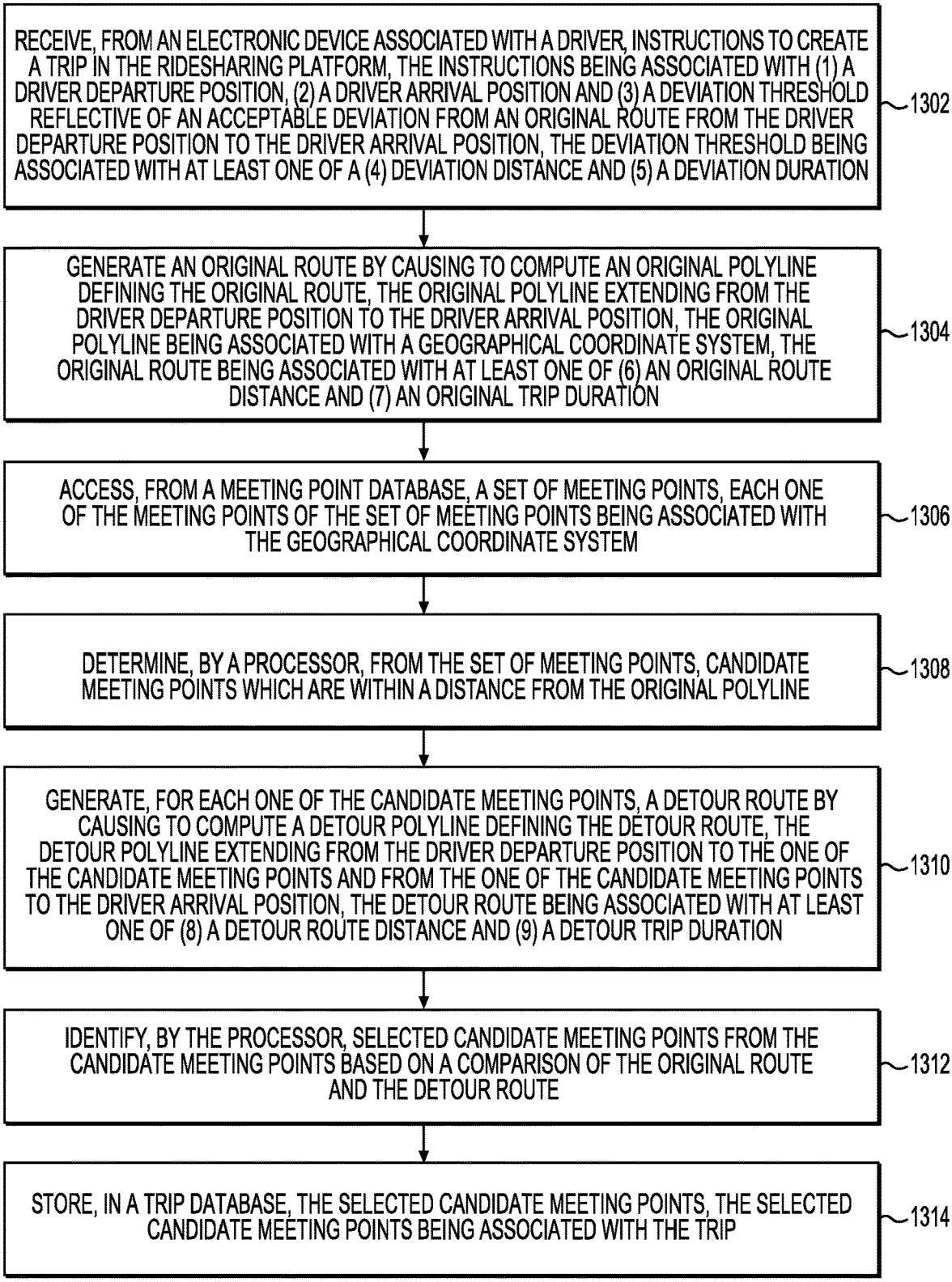
FIG. 13 is a flowchart illustrating a first computer-implemented method implementing embodiments of the present technology.
Figure 14:
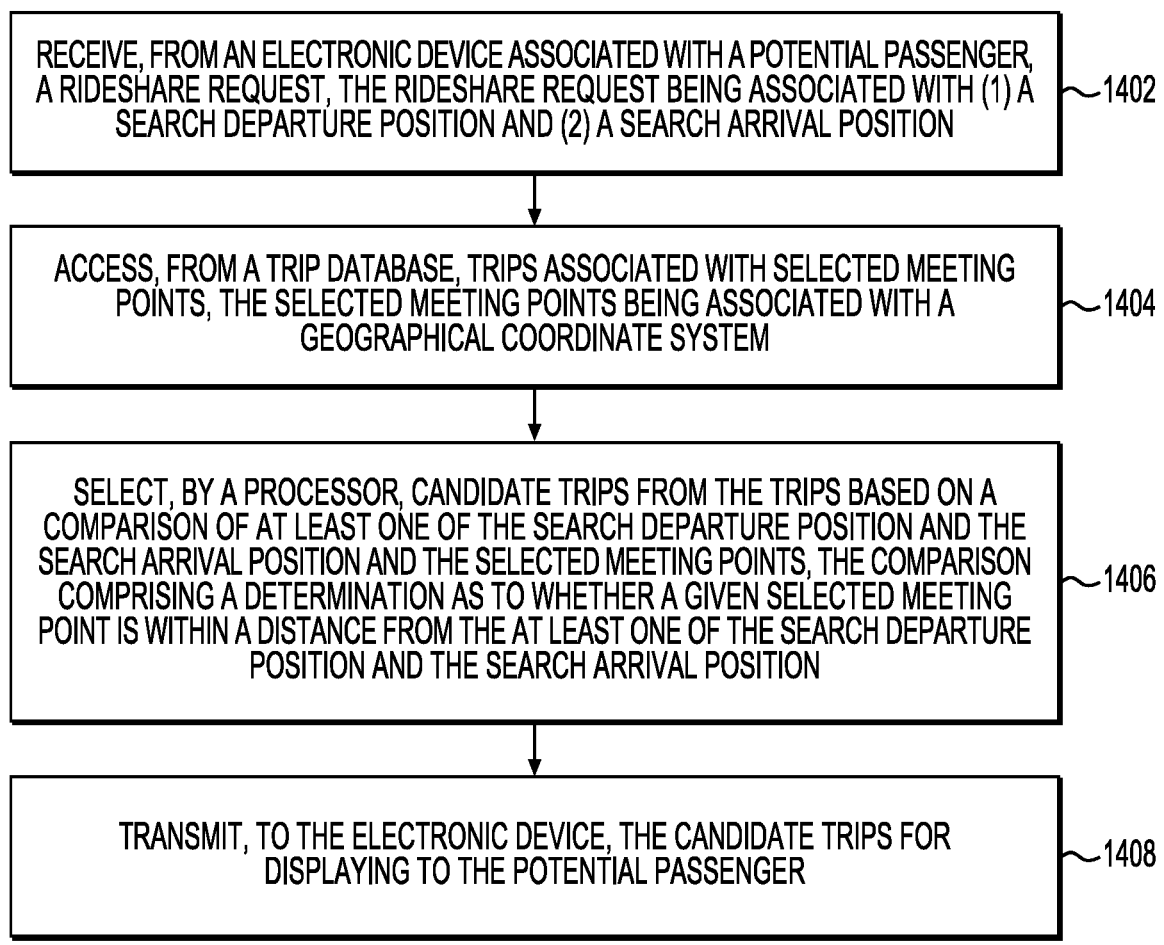
FIG. 14 is a flowchart illustrating a second computer-implemented method implementing embodiments of the present technology.

Having described, with reference to FIG. 1 to FIG. 12, some non-limiting example instances of systems and computer-implemented methods used in connection with the identification of meeting points and the processing of a rideshare request in a ridesharing platform, we shall now describe a general solution to this problem with references to FIG. 13 and FIG. 14.

More specifically, FIG. 13 shows a flowchart illustrating a first computer-implemented method 1300 implementing embodiments of the present technology. The computer-implemented method of FIG. 13 may comprise a computer-implemented method executable by a processor of the one or more servers 340, 342 and 344, the method comprising a series of steps to be carried out by the one or more servers 340, 342 and 344.

The computer-implemented method of FIG. 13 may be carried out, for example, in the context of the one or more servers 340, 342 and 344 by the processor 110 executing program instructions having been loaded into random access memories 130 from solid-state drives 120 of the one or more servers 340, 342 and 344.

The method 1300 starts at a step 1302 by receiving, from an electronic device associated with a driver, instructions to create a trip in the ridesharing platform, the instructions being associated with (1) a driver departure position, (2) a driver arrival position and (3) a deviation threshold reflective of an acceptable deviation from an original route from the driver departure position to the driver arrival position, the deviation threshold being associated with at least one of a (4) deviation distance and (5) a deviation duration. In some embodiments, the deviation distance is one of an absolute deviation distance and a relative deviation distance. In some embodiments, the deviation duration is one of an absolute deviation duration and a relative deviation duration. In some embodiments, the instructions further comprise at least one of a driver stopover, a driver departure date, a driver departure time, a number of available seats and a distance rate to be paid by a passenger.

Then, at a step 1304, the method 1300 proceeds by generating an original route by causing to compute an original polyline defining the original route, the original polyline extending from the driver departure position to the driver arrival position, the original polyline being associated with a geographical coordinate system, the original route being associated with at least one of (6) an original route distance and (7) an original trip duration. In some embodiments, the original polyline comprises a first segment and a second segment, the first segment extending from the driver departure position to a waypoint and the second segment extending from the waypoint to the driver arrival position. In some embodiments, the original route distance is a realistic distance and the original duration is an estimated duration.

At a step 1306, the method 1300 accesses, from a meeting point database, a set of meeting points, each one of the meeting points of the set of meeting points being associated with the geographical coordinate system. Then, at a step 1308, the method 1300 determines, by a processor, from the set of meeting points, candidate meeting points which are within a distance from the original polyline. In some embodiments, the distance is at least one of a predefined distance and a calculated distance, the calculated distance being based on the deviation threshold. In some embodiments, the distance is a parameterised distance from the original polyline which may be predefined or generated dynamically. In some embodiments, the distance is a shortest distance from the original polyline. In some embodiments, the one of the candidate meeting points is one of the driver departure position and the driver arrival position. In some embodiments, the set of meeting points has been generated based on at least one of clustering past driver departure positions and past driver arrival positions, collecting data from users of the ridesharing platform and an external database.

At a step 1310, the method 1300 proceeds to generating for each one of the candidate meeting points, a detour route by causing to compute a detour polyline defining the detour route, the detour polyline extending from the driver departure position to the one of the candidate meeting points and from the one of the candidate meeting points to the driver arrival position, the detour route being associated with at least one of (8) a detour route distance and (9) a detour trip duration. In some embodiments, causing to compute a detour polyline comprises: transmitting, to a routing engine, at least one of the instructions, the driver departure position, the driver arrival position, the original polyline and the original route and the one of the candidate meeting points; causing the routing engine to generate the detour route based on the at least one of the instructions, the driver departure position, the driver arrival position and the original route and the one of the candidate meeting points; and receiving, from the routing engine, the detour polyline, (8) the detour route distance and (9) the detour trip duration. In some embodiments, the detour polyline comprises a first segment and a second segment.

At a step 1312, the method 1300 identifies, by the processor, selected candidate meeting points from the candidate meeting points based on a comparison of the original route and the detour route. At a step 1314, the method 1300 stores, in a trip database, the selected candidate meeting points, the selected candidate meeting points being associated with the trip.

Turning now to FIG. 14, a flowchart illustrating a second computer-implemented method 1400 implementing embodiments of the present technology is shown. The computer-implemented method of FIG. 14 may comprise a computer-implemented method executable by a processor of the one or more servers 340, 342 and 344, the method comprising a series of steps to be carried out by the one or more servers 340, 342 and 344.

The computer-implemented method of FIG. 14 may be carried out, for example, in the context of the one or more servers 340, 342 and 344 by the processor 110 executing program instructions having been loaded into random access memories 130 from solid-state drives 120 of the one or more servers 340, 342 and 344.

The method 1400 starts at a step 1402 by receiving, from an electronic device associated with a potential passenger, a rideshare request, the rideshare request being associated with (1) a search departure position and (2) a search arrival position. In some embodiments, the rideshare request is further associated with at least one of a potential passenger departure date, a potential passenger departure time, a number of required seats.

Then, at a step 1404, the method 1400 proceeds to accessing, from a trip database, trips associated with selected meeting points, the selected meeting points being associated with a geographical coordinate system. In some embodiments, each one of the trips is associated with a driver departure date, a driver departure time and a number of available seats.

At a step 1406, the method 1400 proceeds to selecting, by a processor, candidate trips from the trips based on a comparison of at least one of the search departure position and the search arrival position and the selected meeting points, the comparison comprising a determination as to whether a given selected meeting point is within a distance from the at least one of the search departure position and the search arrival position. In some embodiments, the given selected meeting point is one of the search departure position and the search arrival position. In some embodiments, selecting candidate trips from the trips further comprises filtering trips based on a comparison of the driver departure date, the driver departure time and the number of available seats with the potential passenger departure date, the potential passenger departure time and the number of required seats. In some embodiments, selecting candidate trips from the trips further comprises comparing at least one of the search route distance and the search route duration with at least one of a driver original route, a driver original route distance, a driver original route duration, a driver deviation threshold, a driver deviation distance and a driver deviation duration, the driver original route, the driver original route distance, the driver original route duration, the driver deviation threshold, the driver deviation distance and the driver deviation duration being associated with a given trip of the trips. In some embodiments, the distance is a shortest distance from at least one of the search departure position and the search arrival position. In some embodiments, the distance is a parameterised distance.

In some embodiments, each one of the selected meeting points has been previously selected based on a distance from an original polyline extending from a driver departure position to a driver arrival position, the driver departure position and the driver arrival position being associated with a trip, the trip being associated with a corresponding selected meeting point.

Then, at a step 1408, the method 1400 proceeds to transmitting, to the electronic device, the candidate trips for displaying to the potential passenger. In some embodiments, the method 1400 further comprises generating, by the processor, a search route distance and a search route duration, the search route distance and the search route duration being based on the potential passenger departure position and the potential passenger arrival position.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

As such, the methods and systems implemented in accordance with some non-limiting embodiments of the present technology can be represented as follows, presented in numbered clauses.

[Clause 1] A computer-implemented method for execution by a ridesharing platform, the method comprising:

receiving, from an electronic device associated with a driver, instructions to create a trip in the ridesharing platform, the instructions being associated with (1) a driver departure position, (2) a driver arrival position and (3) a deviation threshold reflective of an acceptable deviation from an original route from the driver departure position to the driver arrival position, the deviation threshold being associated with at least one of a (4) deviation distance and (5) a deviation duration;

generating an original route by causing to compute an original polyline defining the original route, the original polyline extending from the driver departure position to the driver arrival position, the original polyline being associated with a geographical coordinate system, the original route being associated with at least one of (6) an original route distance and (7) an original trip duration;

accessing, from a meeting point database, a set of meeting points, each one of the meeting points of the set of meeting points being associated with the geographical coordinate system;

determining, by a processor, from the set of meeting points, candidate meeting points which are within a distance from the original polyline;

generating, for each one of the candidate meeting points, a detour route by causing to compute a detour polyline defining the detour route, the detour polyline extending from the driver departure position to the one of the candidate meeting points and from the one of the candidate meeting points to the driver arrival position, the detour route being associated with at least one of (8) a detour route distance and (9) a detour trip duration;

identifying, by the processor, selected candidate meeting points from the candidate meeting points based on a comparison of the original route and the detour route; and storing, in a trip database, the selected candidate meeting points, the selected candidate meeting points being associated with the trip.

[Clause 2] The method of clause 1, wherein the one of the candidate meeting points is one of the driver departure position and the driver arrival position.

[Clause 3] The method of clause 1, wherein causing to compute a detour polyline comprises:

transmitting, to a routing engine, at least one of the instructions, the driver departure position, the driver arrival position, the original polyline and the original route and the one of the candidate meeting points;

causing the routing engine to generate the detour route based on the at least one of the instructions, the driver departure position, the driver arrival position and the original route and the one of the candidate meeting points; and receiving, from the routing engine, the detour polyline, (8) the detour route distance and (9) the detour trip duration.

[Clause 4] The method of clause 1, wherein the deviation distance is one of an absolute deviation distance and a relative deviation distance.

[Clause 5] The method of clause 1, wherein the deviation duration is one of an absolute deviation duration and a relative deviation duration.

[Clause 6] The method of clause 1, wherein the original polyline comprises a first segment and a second segment, the first segment extending from the driver departure position to a waypoint and the second segment extending from the waypoint to the driver arrival position.

[Clause 7] The method of clause 1, wherein the detour polyline comprises a first segment and a second segment.

[Clause 8] The method of clause 1, wherein the distance is at least one of a predefined distance and a calculated distance, the calculated distance being based on the deviation threshold.

[Clause 9] The method of clause 1, wherein the distance is a shortest distance from the original polyline.

[Clause 10] The method of clause 1, wherein the distance is a parameterised distance from the original polyline.

[Clause 11] The method of clause 1, wherein the original route distance is a realistic distance and the original duration is an estimated duration.

[Clause 12] The method of clause 1, wherein the set of meeting points has been generated based on at least one of clustering past driver departure positions and past driver arrival positions, collecting data from users of the ridesharing platform and an external database.

[Clause 13] The method of clause 1, wherein the instructions further comprise at least one of a driver stopover, a driver departure date, a driver departure time, a number of available seats and a distance rate to be paid by a passenger.

[Clause 14] A computer-implemented method for execution by a ridesharing platform, the method comprising:
receiving, from an electronic device associated with a potential passenger, a rideshare request, the rideshare request being associated with (1) a search departure position and (2) a search arrival position;
accessing, from a trip database, trips associated with selected meeting points, the selected meeting points being associated with a geographical coordinate system;
selecting, by a processor, candidate trips from the trips based on a comparison of at least one of the search departure position and the search arrival position and the selected meeting points, the comparison comprising a determination as to whether a given selected meeting point is within a distance from the at least one of the search departure position and the search arrival position; and
transmitting, to the electronic device, the candidate trips for displaying to the potential passenger.

[Clause 15] The method of clause 14, wherein the given selected meeting point is one of the search departure position and the search arrival position.

[Clause 16] The method of clause 14, wherein the rideshare request is further associated with at least one of a potential passenger departure date, a potential passenger departure time, a number of required seats.

[Clause 17] The method of clause 14, wherein each one of the trips is associated with a driver departure date, a driver departure time and a number of available seats.

[Clause 18] The method of clause 14, wherein selecting candidate trips from the trips further comprises filtering trips based on a comparison of the driver departure date, the driver departure time and the number of available seats with the potential passenger departure date, the potential passenger departure time and the number of required seats.

[Clause 19] The method of clause 14, further comprising:
generating, by the processor, a search route distance and a search route duration, the search route distance and the search route duration being based on the potential passenger departure position and the potential passenger arrival position.

[Clause 20] The method of clause 18, wherein selecting candidate trips from the trips further comprises comparing at least one of the search route distance and the search route duration with at least one of a driver original route, a driver original route distance, a driver original route duration, a driver deviation threshold, a driver deviation distance and a driver deviation duration, the driver original route, the driver original route distance, the driver original route duration, the driver deviation threshold, the driver deviation distance and the driver deviation duration being associated with a given trip of the trips.

[Clause 21] The method of clause 14, wherein the distance is a shortest distance from at least one of the search departure position and the search arrival position.

[Clause 22] The method of clause 14, wherein the distance is a parameterised distance.

[Clause 23] The method of clause 14, wherein each one of the selected meeting points has been previously selected based on a distance from an original polyline extending from a driver departure position to a driver arrival position, the driver departure position and the driver arrival position being associated with a trip, the trip being associated with a corresponding selected meeting point.

[Clause 24] A computer-implemented system configured to perform the method of any one of clauses 1 to 23.

[Clause 25] A non-transitory computer-readable medium comprising computer-executable instructions that cause a system to execute the method according to any one of clauses 1 to 23.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for execution by a ridesharing platform, the method comprising:
receiving, from an electronic device associated with a driver, instructions to create a trip itinerary in the ridesharing platform, the instructions being associated with a driver departure position, a driver arrival position, and a deviation threshold indicative of an acceptable deviation from an original route defining travel between the driver departure position to the driver arrival position, the deviation threshold being associated with at least one of a deviation distance metric and a deviation duration metric;
generating an original route by computing an original route polyline that extends from the driver departure position to the driver arrival position to define the original route in accordance with a geographical coordinate system, the original route being associated with at least one of an original route distance metric and an original trip duration metric;
determining, by a processor, a set of candidate meeting points from a plurality of stored meetings points associated with the geographical coordinate system, the determining operating to disregard meeting points that are beyond a specified distance metric from the computed original route polyline and to produce a set of a limited number of candidate meeting points requiring calculation of detour polylines;

calculating, by the processor, for each one of the set of candidate meeting points a detour route by causing to compute computing a detour polyline defining the detour that extends from the driver departure position to the one of the candidate meeting points and from the one of the candidate meeting points to the driver arrival position, each of the calculated detour routes being associated with at least one of a detour route distance metric and a detour trip duration metric; and comparing, by the processor, at least one of the original route distance and trip duration metrics with at least one of the detour route distance and trip duration metrics for each of the detour routes, to establish a subset of select candidate meeting points that are evaluated as being acceptable to associate with the trip itinerary; and storing, in the ridesharing platform, the trip itinerary and the associated subset of select candidate meeting points, wherein, upon receipt of subsequent rideshare requests containing location data from potential passengers, the ridesharing platform processes the subsequent rideshare requests and responds with one or more candidate trips based on the stored subset of the select candidate meeting points without performing detour polyline calculations of the location data contained by the subsequent rideshare requests.

2. The method of claim 1, wherein the one of the candidate meeting points is one of the driver departure position and the driver arrival position.

3. The method of claim 1, wherein causing to compute a detour polyline comprises:

transmitting, to a routing engine, at least one of the instructions, the driver departure position, the driver arrival position, the original polyline and the original route and the one of the candidate meeting points;

causing the routing engine to generate the detour route based on the at least one of the instructions, the driver departure position, the driver arrival position and the original route and the one of the candidate meeting points; and receiving, from the routing engine, the detour polyline, the detour route distance and the detour trip duration.

4. The method of claim 1, wherein the deviation distance is one of an absolute deviation distance and a relative deviation distance.

5. The method of claim 1, wherein the deviation duration is one of an absolute deviation duration and a relative deviation duration.

6. The method of claim 1, wherein the original polyline comprises a first segment and a second segment, the first segment extending from the driver departure position to a waypoint and the second segment extending from the waypoint to the driver arrival position.

7. The method of claim 1, wherein the detour polyline comprises a first segment and a second segment.

8. The method of claim 1, wherein the distance is at least one of a predefined distance and a calculated distance, the calculated distance being based on the deviation threshold.

9. The method of claim 1, wherein the distance is a shortest distance from the original polyline.

10. The method of claim 1, wherein the distance is a parameterised distance from the original polyline.

11. The method of claim 1, wherein the original route distance is a realistic distance and the original duration is an estimated duration.

12. The method of claim 1, wherein the set of meeting points has been generated based on at least one of clustering past driver departure positions and past driver arrival positions, collecting data from users of the ridesharing platform and an external database.

13. The method of claim 1, wherein the instructions further comprise at least one of a driver stopover, a driver departure date, a driver departure time, a number of available seats and a distance rate to be paid by a passenger.

14. A computer-implemented system for processing a rideshare request, the system comprising:

a non-transitory computer-readable medium;

an electronic device associated with a driver containing a transceiver configured to wirelessly receive and transmit rideshare request information; and a processor configured to:

receive, from the electronic device, instructions to create a trip itinerary in the ridesharing platform, the instructions being associated with a driver departure position, a driver arrival position, and a deviation threshold indicative of an acceptable deviation defining travel between an original route from the driver departure position to the driver arrival position, the deviation threshold being associated with at least one of a deviation distance metric and a deviation duration metric;

generate an original route by computing an original route polyline that extends from the driver departure position to the driver arrival position to define the original route in accordance with a geographical coordinate system, the original route being associated with at least one of an original route distance metric and an original trip duration metric;

determine, by a processor, a set of candidate meeting points from a plurality of stored meetings points associated with the geographical coordinate system, the determination operating to disregard meeting points that are beyond a specified distance metric from the computed original route polyline and to produce a set of a limited number of candidate meeting points requiring calculation of detour polylines;

calculate, by the processor, for each one of the set of candidate meeting points a detour route by computing a detour polyline defining the detour that extends from the driver departure position to the one of the candidate meeting points and from the one of the candidate meeting points to the driver arrival position, each of the calculated detour routes being associated with at least one of a detour route distance metric and a detour trip duration metric;

compare, by the processor, at least one of the original route distance and trip duration metrics with at least one of the detour route distance and trip duration metrics for each of the detour routes, to establish a subset of select candidate meeting points that are evaluated as being acceptable to associate with the trip itinerary; and store, in the ridesharing platform, the trip itinerary and the associated subset of select candidate meeting points, wherein, upon receipt of subsequent rideshare requests containing location data from potential passengers, the ridesharing platform processes the subsequent rideshare requests and responds with one or more candidate trips based on the stored subset of the select candidate meeting points without performing detour polyline calculations of the location data contained by the subsequent rideshare requests.

* * * * *

UNITED STATES PATENT AND TRADEMARK OFFICE
CERTIFICATE OF CORRECTION

Page 1 of 1

PATENT NO. : 10,900,795 B2
APPLICATION NO. : 15/656011
DATED : January 26, 2021
INVENTOR(S) : Frederic Gabriel Mazzella et al.

It is certified that error appears in the above-identified patent and that said Letters Patent is hereby corrected as shown below:

In the Claims

Column 23, Claim 1, Lines 8-9 should read --candidate meeting points a detour route by computing a detour polyline defining the--

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*